United States Patent
Xiu et al.

(10) Patent No.: US 11,425,418 B2
(45) Date of Patent: Aug. 23, 2022

(54) OVERLAPPED BLOCK MOTION COMPENSATION

(71) Applicant: VID SCALE, INC., Wilmington, DE (US)

(72) Inventors: Xiaoyu Xiu, San Diego, CA (US); Yuwen He, San Diego, CA (US); Yan Ye, San Diego, CA (US); Yan Zhang, San Diego, CA (US)

(73) Assignee: VID SCALE, Inc., Wilmington, DE (US)

(*) Notice: Subject to any disclaimer, the term of this patent is extended or adjusted under 35 U.S.C. 154(b) by 0 days.

(21) Appl. No.: 16/760,905

(22) PCT Filed: Nov. 1, 2018

(86) PCT No.: PCT/US2018/058605
§ 371 (c)(1),
(2) Date: Apr. 30, 2020

(87) PCT Pub. No.: WO2019/089864
PCT Pub. Date: May 9, 2019

(65) Prior Publication Data
US 2021/0185353 A1    Jun. 17, 2021

Related U.S. Application Data

(60) Provisional application No. 62/580,104, filed on Nov. 1, 2017.

(51) Int. Cl.
*H04N 19/583* (2014.01)
*H04N 19/184* (2014.01)
(Continued)

(52) U.S. Cl.
CPC ......... *H04N 19/583* (2014.11); *H04N 19/176* (2014.11); *H04N 19/184* (2014.11); *H04N 19/517* (2014.11); *H04N 19/55* (2014.11)

(58) Field of Classification Search
None
See application file for complete search history.

(56) References Cited

U.S. PATENT DOCUMENTS 9,071,851 B2 *   6/2015   Guo ..................... H04N 19/127
10,771,811 B2 *   9/2020   Liu ....................... H04N 19/583
(Continued)

FOREIGN PATENT DOCUMENTS

WO    2015/081888 A1    6/2015

OTHER PUBLICATIONS

Chen et al.,"CE2: Report of OBMC with Motion Merging", MPEG Meeting, Torino, Jul. 13, 2011.*
(Continued)

*Primary Examiner* — Mohammad J Rahman
(74) *Attorney, Agent, or Firm* — Condo Roccia Koptiw LLP

(57) ABSTRACT

External overlapped block motion compensation (OBMC) may be performed for samples of a coding unit (CU) located along an inter-CU boundary of the CU while internal OBMC may be performed separately for samples located along inter-sub-block boundaries inside the CU. External OBMC may be applied based on substantially similar motion information associated with multiple external blocks neighboring the CU. The external blocks may be treated as a group to provide OBMC for multiple boundary samples together in an external OBMC operation. Internal OBMC may be applied using the same sub-block size used for sub-block level motion derivation. Internal OBMC may be disabled for the CU, for example, if the CU is coded in a spatial-temporal motion vector prediction (STMVP) mode.

21 Claims, 17 Drawing Sheets

(51) Int. Cl.
*H04N 19/176* (2014.01)
*H04N 19/55* (2014.01)
*H04N 19/517* (2014.01)

(56) References Cited

U.S. PATENT DOCUMENTS

| | | | | |
|---|---|---|---|---|
| 10,880,570 | B2* | 12/2020 | Chuang | H04N 19/198 |
| 2011/0097004 | A1* | 4/2011 | Lee | H04N 19/51 382/233 |
| 2012/0163459 | A1* | 6/2012 | Tsyrganovich | H04N 19/513 375/240.16 |
| 2013/0128974 | A1 | 5/2013 | Chien et al. | |
| 2016/0219302 | A1* | 7/2016 | Liu | H04N 19/583 |
| 2016/0295215 | A1* | 10/2016 | Hsu | H04N 19/105 |
| 2016/0366435 | A1* | 12/2016 | Chien | H04N 19/172 |
| 2017/0013279 | A1* | 1/2017 | Puri | H04N 19/527 |
| 2017/0085913 | A1* | 3/2017 | Chen | H04N 19/105 |
| 2018/0041760 | A1* | 2/2018 | Koo | H04N 19/122 |
| 2018/0070105 | A1* | 3/2018 | Jin | H04N 19/172 |
| 2018/0098079 | A1* | 4/2018 | Chuang | H04N 19/51 |
| 2019/0158876 | A1* | 5/2019 | Liu | H04N 19/583 |
| 2019/0273943 | A1* | 9/2019 | Zhao | H04N 19/176 |
| 2019/0387251 | A1* | 12/2019 | Lin | H04N 19/105 |

OTHER PUBLICATIONS

"JEM-7.0 Reference Software", Available at <https://jvet.hhi.fraunhofer.de/svn/svn_HMJEMSoftware/tags/HM-16.6-JEM-7.0>, 1 page.
Alshin et al., "AHG6: On Bio Memory Bandwidth", JVET-D0042, Samsung Electronics Ltd., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.
Alshina et al., "Known Tools Performance Investigation for Next Generation Video Coding", VCEG-AZ05, ITU—Telecommunications Standardization Sector, Study Group 16 Question 6, Video Coding Experts Group (VCEG), 52nd Meeting, Warsaw, Poland, Jun. 19-26, 2015, 5 pages.
Bross et al., "High Efficiency Video Coding (HEVC) Text Specification Draft 8", JCTVC-J1003, Editor, Joint Collaborative Team on Video Coding (JCT-VC) of ITU-T SG16 WP3 and ISO/IEC JTC1/SC29/WG11, 10th Meeting: Stockholm, SE, Jul. 11-20, 2012, 294 pages.
Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 50 pages.
Chen et al., "Coding Tools Investigation for Next Generation Video Coding", Qualcomm Incorporated, COM 16-C 806-E, Jan. 2015, pp. 1-7.
Choi et al., "Motion-Compensated Frame Interpolation Using Bilateral Motion Estimation and Adaptive Overlapped Block Motion Compensation", IEEE Transactions on Circuits and Systems for Video Technology, vol. 17, No. 4, Apr. 2007, pp. 407-416.
ISO/IEC, "Algorithm Description of Joint Exploration Test Model 1 (JEM 1)", ISO/IEC JTC1/SC29/WG11/N15790, Geneva, CH, Oct. 2015, 27 pages.
ITU-T, "Advanced Video Coding for Generic Audiovisual Services", H.264, Series H: Audiovisual and Multimedia Systems, Infrastructure of Audiovisual Services—Coding of Moving Video, Nov. 2007, 564 pages.
Karczewicz et al., "Report of AHG1 on Coding Efficiency Improvements", VCEG-AZ01, Qualcomm, Samsung, ITU—Telecommunications Standardization Sector, Study Group 16 Question 6, Video Coding Experts Group (VCEG), 52nd Meeting: Warsaw, Poland, Jun. 19-26, 2015, 2 pages.
Lin et al., "CE10.2.3: A Simplified Design of Overlapped Block Motion Compensation based on the Combination of CE10.2.1 and CE10.2.2", JVET-L0255, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-4.
Ohm et al., "Report of AHG on Future Video Coding Standardization Challenges", AHG, ISO/IEC JTC1/SC29/WG11 MPEG2014/M36782, Warsaw, Poland, Jun. 2015, 4 pages.
SMPTE, "VC-1 Compressed Video Bitstream Format and Decoding Process", SMPTE 421M-2006, Apr. 2006, 493 pages.
Tourapis et al., "H.264/14496-10 AVC Reference Software Manual", JVT-AE010, Dolby Laboratories Inc., Fraunhofer-Institute HHI, Microsoft Corporation, Joint Video Team (JVT) of ISO/IEC MPEG & ITU-T VCEG (ISO/IEC JTC1/SC29/WG11 and ITU-T SG16 Q.6), 31st Meeting: London, UK, Jun. 28-Jul. 3, 2009, 90 pages.

* cited by examiner

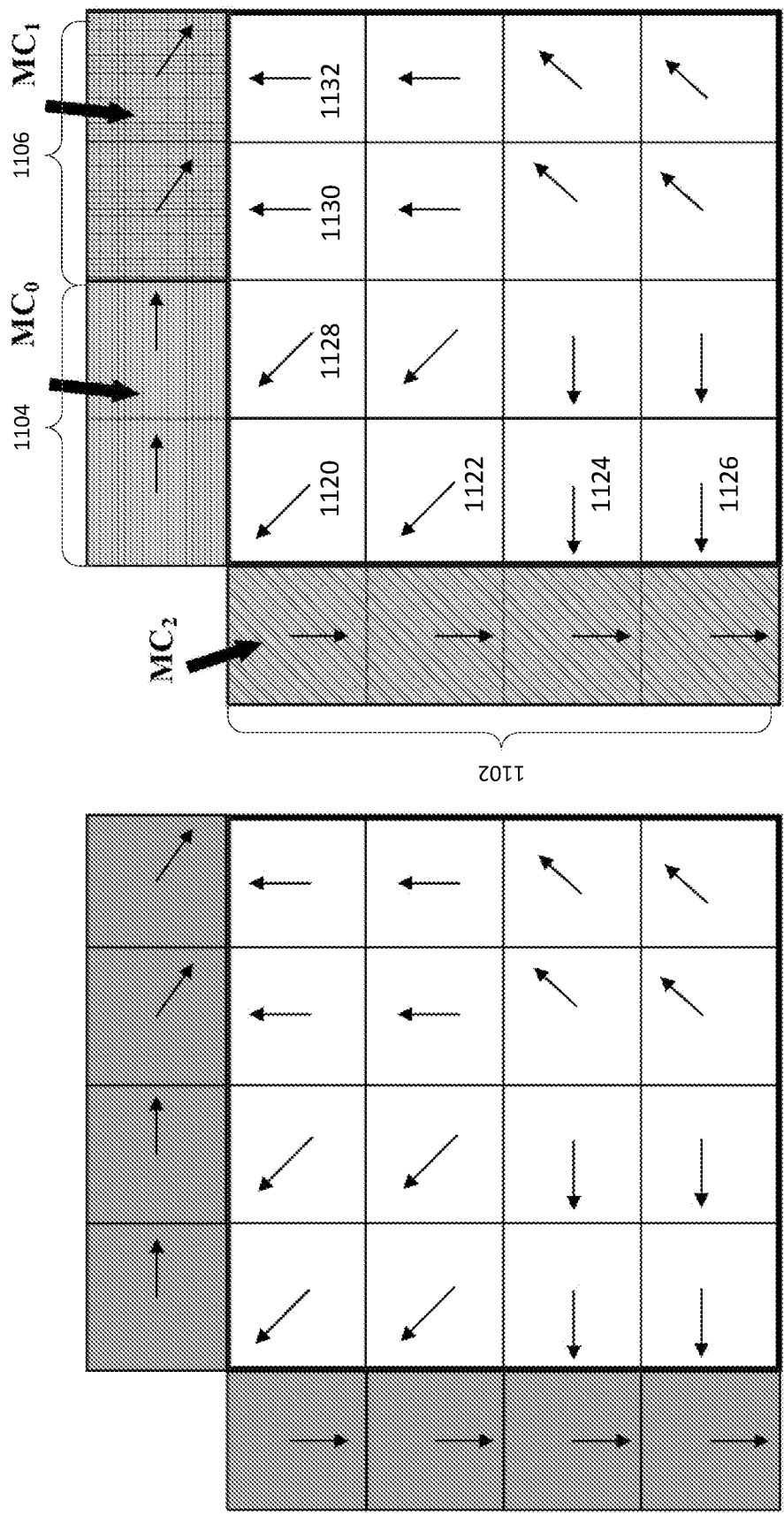

OVERLAPPED BLOCK MOTION COMPENSATION

CROSS-REFERENCE TO RELATED APPLICATIONS

This application is the National Stage Entry under 35 U.S.C. § 371 of Patent Cooperation Treaty Application No. PCT/US2018/058605, filed Nov. 1, 2018, which claims the benefit of Provisional U.S. Patent Application No. 62/580,104, filed Nov. 1, 2017, the disclosure of which is incorporated herein by reference in its entirety.

BACKGROUND

Digital video compression technologies may enable efficient digital video communication, distribution and consumption. Some examples of standardized video compression technologies include H.261, MPEG-1, MPEG-2, H.263, MPEG-4 part2 and H.264/MPEG-4 part 10 AVC. Advanced video compression technologies such as High Efficiency Video Coding (HEVC) may double the compression rate (e.g., with 50% bit-rate savings) while still maintain similar video quality as H.264/AVC.

SUMMARY

Systems, methods, and instrumentalities are disclosed for applying overlapped block motion compensation (OBMC) to a video coding unit. The coding unit may be received in a video bitstream and may be neighbored by multiple external sub-blocks along a boundary of the coding unit. It may be determined that these external sub-blocks share substantially similar motion information that may be used to perform merged OBMC for a plurality of boundary samples of the coding unit. The boundary samples may belong to different sub-blocks of the coding unit located across the boundary from the external sub-blocks. In the merged OBMC operation, the external sub-blocks may be treated as a group and the substantially similar motion information shared by the external sub-blocks may be used to provide OBMC for the boundary samples together in an external OBMC operation.

Internal OBMC may be performed for samples located near one or more inter-sub-block boundaries inside a coding unit. The internal OBMC may be performed separately from the external OBMC operation described above. The internal OBMC may be based on the same sub-block size used for sub-block level motion derivation. The internal OBMC may be disabled, for example, if the CU is coded in certain sub-block modes such as the spatial-temporal motion vector prediction (STMVP) mode.

BRIEF DESCRIPTION OF THE DRAWINGS

FIGS. 11A and 11B show an example of external OBMC-based motion compensation.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Video coding systems may compress digital video signals, for example, to reduce storage and/or save transmission bandwidth. There are different types of video coding systems, such as block-based, wavelet-based and object-based systems. Block-based video coding systems may include international video coding standards, such as Moving Picture Experts Group (MPEG) 1/2/4 part 2, H.264/MPEG-4 part 10 Advanced Video Coding (AVC), VC-1 and High Efficiency Video Coding (HEVC).

HEVC may provide approximately 50% bit-rate savings and still maintain the same perceptual quality when compared to some earlier-generation video coding technologies (e.g., H.264/MPEG AVC). Even greater coding efficiency may be achieved with advanced coding tools. These tools may include those integrated into the Joint Exploration Model (JEM) codebase and tested under the JVET common test conditions (CTCs). The tools may be based on an HEVC Model (HM) and/or a block-based hybrid video coding framework.

Figure 1:
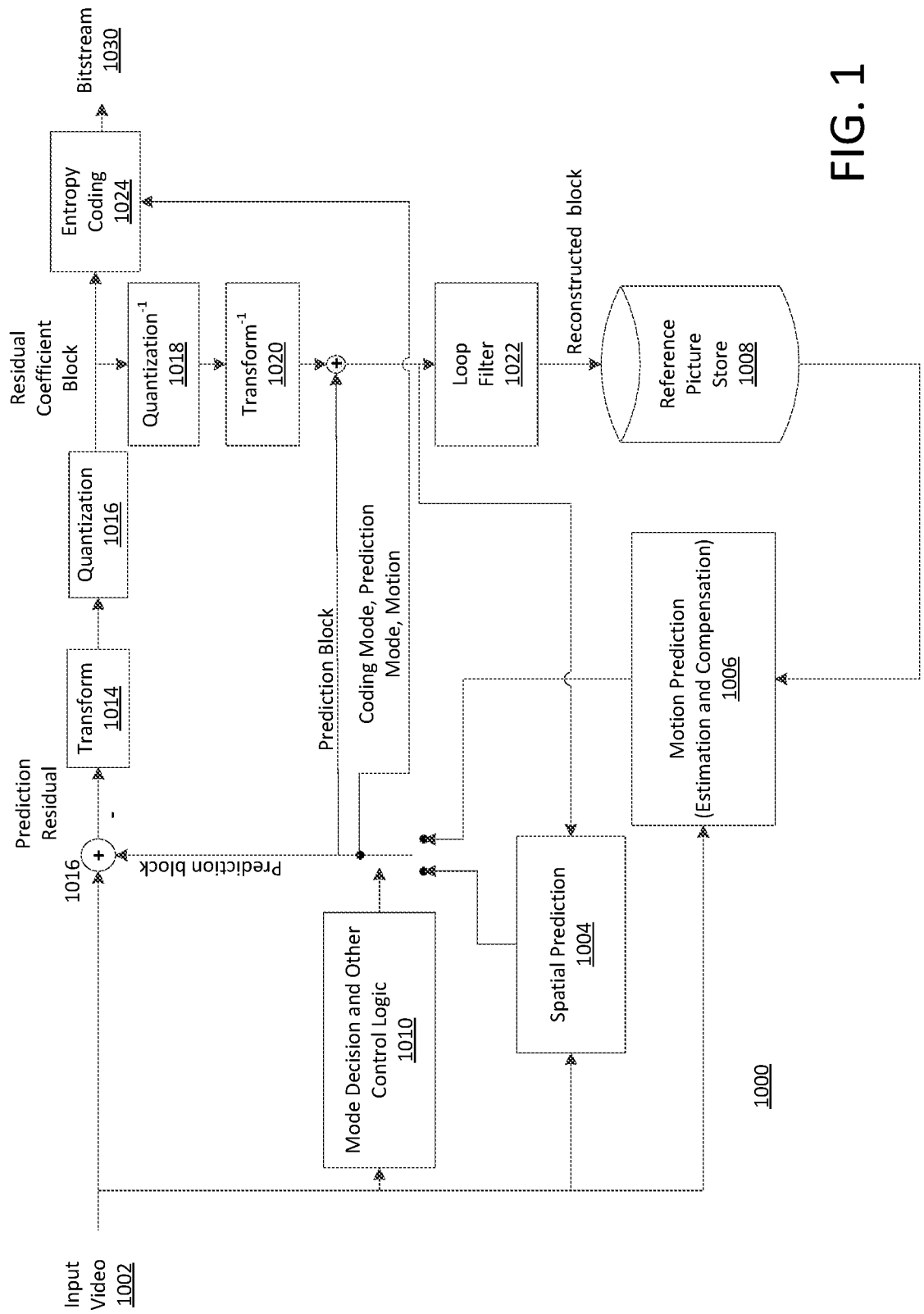
FIG. 1 shows an example of a block-based hybrid video encoder.

FIG. 1 shows an example of a block-based hybrid video encoding system (e.g., an encoder 1000). The encoder may be configured to process input video signal 1002 block by block. These video blocks may also be referred to herein as coding units (CUs) or macroblocks (MBs), and may have different block sizes including an extended size of 64×64 pixels. High-resolution (e.g., 1080p and beyond) video content may be efficiently compressed using block-based coding techniques (e.g., with a block size of 64×64 pixels). A CU may be partitioned into prediction units (PUs). Different CUs or PUs may be coded using the same prediction technique or using different prediction techniques. These prediction techniques may include, for example, spatial prediction 1004 (which may also be referred to as intra prediction) and temporal prediction 1006 (which may also be referred to as inter prediction, motion prediction, or motion compensated prediction). Spatial prediction may predict a current video block using samples (e.g., reference samples) from one or more previously-coded neighboring blocks of the same picture or slice. Spatial prediction may reduce spatial redundancy that may be inherent in a video signal. Temporal prediction may predict a current video block using samples (e.g., reconstructed pixels) from one or more previously-coded pictures. Temporal prediction may reduce temporal redundancy that may be inherent in a video signal. The temporal prediction block(s) of a current block may be signaled via one or more motion vectors (MVs), which may indicate the amount and direction of motion between the current block and the prediction block. A reference picture index may be signaled for a video block (e.g., for each video block), for example, when multiple reference pictures are supported (e.g., in H.264/AVC and HEVC). The reference picture index may be used to identify a reference picture (e.g., in reference picture store 1008) from which a temporal prediction signal (e.g., a reference sample) may be derived.

A Mode Decision and Control Logic unit 1010 of the encoder 100 may be configured to select (e.g., after spatial and/or temporal prediction have been performed) a suitable prediction mode for a CU or PU, for example, based on a rate-distortion optimization procedure. A prediction block may be subtracted from a current video block at 1012 and the resulting prediction residuals may be de-correlated and/or quantized, e.g., via transform unit 1014 and/or quantization unit 1016, to obtain quantized residual coefficients. The quantized residual coefficients may go through inverse quantization at 1018 and inverse transform at 1020, e.g., to produce reconstructed residuals. A reconstructed video block may be formed by adding the reconstructed residuals back to the prediction block. In-loop filtering 1022 (e.g., a de-blocking filter and/or an Adaptive Loop Filter) may be applied to the reconstructed video block, for example, before it is put into reference picture store 1008 and used to code future video blocks. Entropy coding unit 1024 may be used to generate an output video bit-stream 1030, for example, by compressing and packing coding mode (e.g. inter or intra) information, prediction mode information, motion information, and/or quantized residual coefficients into the video bit-stream 1030.

Figure 2:
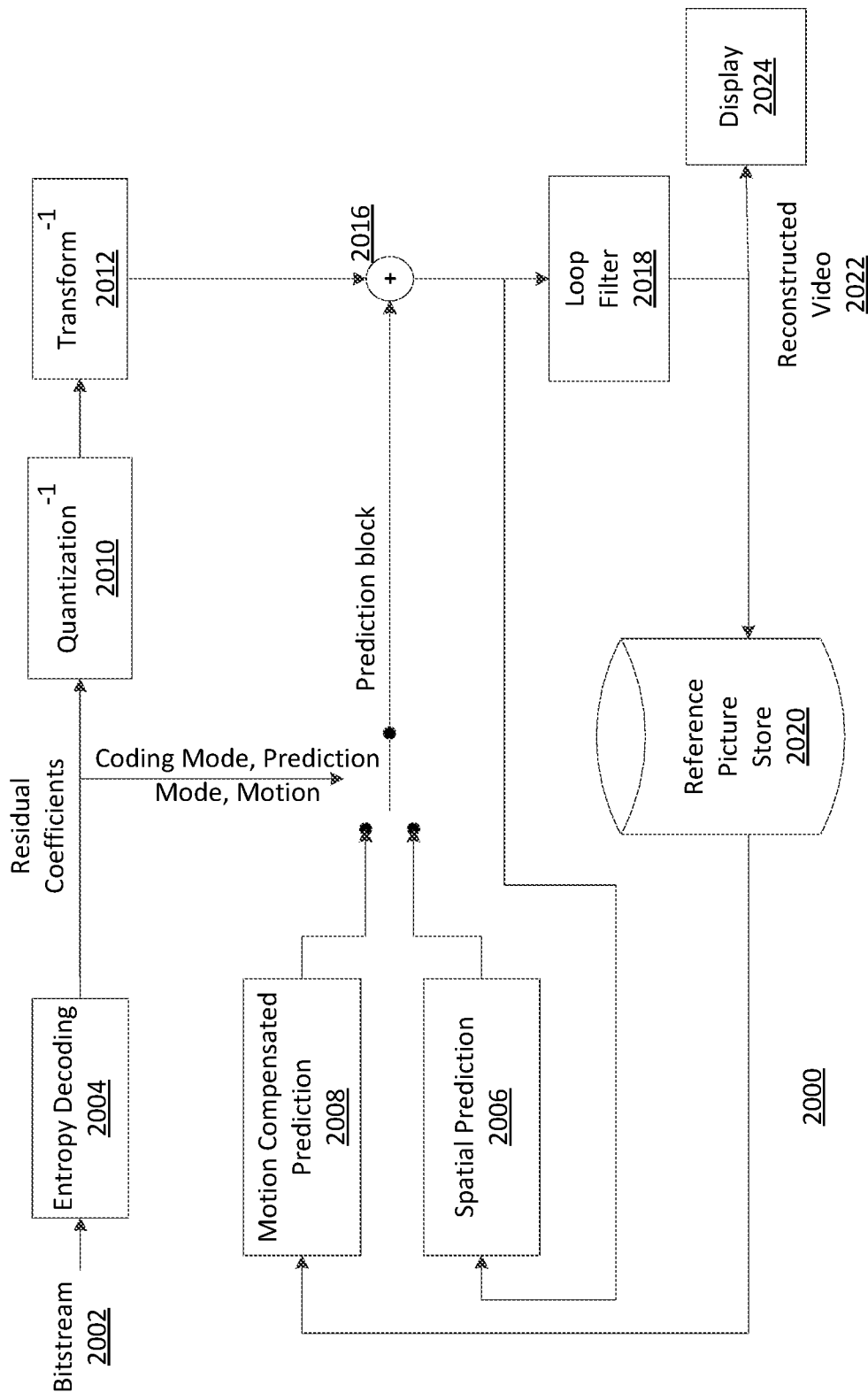
FIG. 2 shows an example of a block-based video decoder.

FIG. 2 shows an example of a block-based video decoder 2000. The video decoder 2000 may be configured to unpack and entropy-decoded a received video bit-stream 2002, e.g., at entropy decoding unit 2004. Coding mode and prediction information obtained from the video bit-stream 2002 may be sent to a spatial prediction unit 2006 (e.g., when the video content is intra coded) or a temporal prediction unit 2008 (e.g., when the video content is inter coded). A prediction block may be formed at the spatial prediction unit 2006 or the temporal prediction unit 2008. Residual transform coefficients may be provided to an inverse quantization unit 2010 and an inverse transform unit 2012, e.g., to reconstruct a residual block. The prediction block and residual block may be added together, e.g., at 2016, to produce a reconstructed block. In-loop filtering 2018 may be applied to the reconstructed block, for example, before it is stored in reference picture store 2020. Reconstructed video content 2022 from reference picture store 2020 may be used to drive a display device 2024 and/or to predict future video blocks.

Functional modules including spatial prediction, temporal prediction, transform, quantization, entropy coding, and/or loop filtering may be used. Overlapped block motion compensation (OBMC) may be used to alleviate blocking artifacts that may exist between neighboring prediction blocks, e.g., at a motion compensation stage. Coding may be performed using sub-block or sub-CU motion compensation in which motion parameters may be derived at a sub-block or sub-CU level. In examples, OBMC and sub-block level motion compensation may be combined to increase coding gains.

A coding unit may be split into multiple sub-blocks and motion information may be derived (e.g., separately) for the sub-blocks (e.g., instead of allowing only one motion vector for a prediction direction). Sub-block motion information may be used, for example, to generate prediction samples for a coding unit (e.g., for each sub-block of the coding unit and eventually for the coding unit) at the motion compensation stage. Sub-block level motion compensation techniques may include advanced temporal motion vector prediction (ATMVP), spatial-temporal motion vector prediction (STMVP), frame-rate up conversion (FRUC) mode, affine mode, etc.

With ATMVP, multiple motion information (e.g. including multiple motion vectors and/or multiple reference indices) may be derived for a current block using temporal motion vector prediction. For example, motion information for a (e.g. each) sub-block of the current block may be derived based on one or more small blocks of a temporal picture that neighbors the current picture. A block (e.g. a "collocated block") may be identified in a temporal reference picture that corresponds to the current block. The temporal reference picture may be referred to as a collocated picture. The current block may be split into multiple sub-blocks, and motion information of each of the sub-blocks may be derived using corresponding small blocks in the collocated block of the collocated picture.

Figure 3:
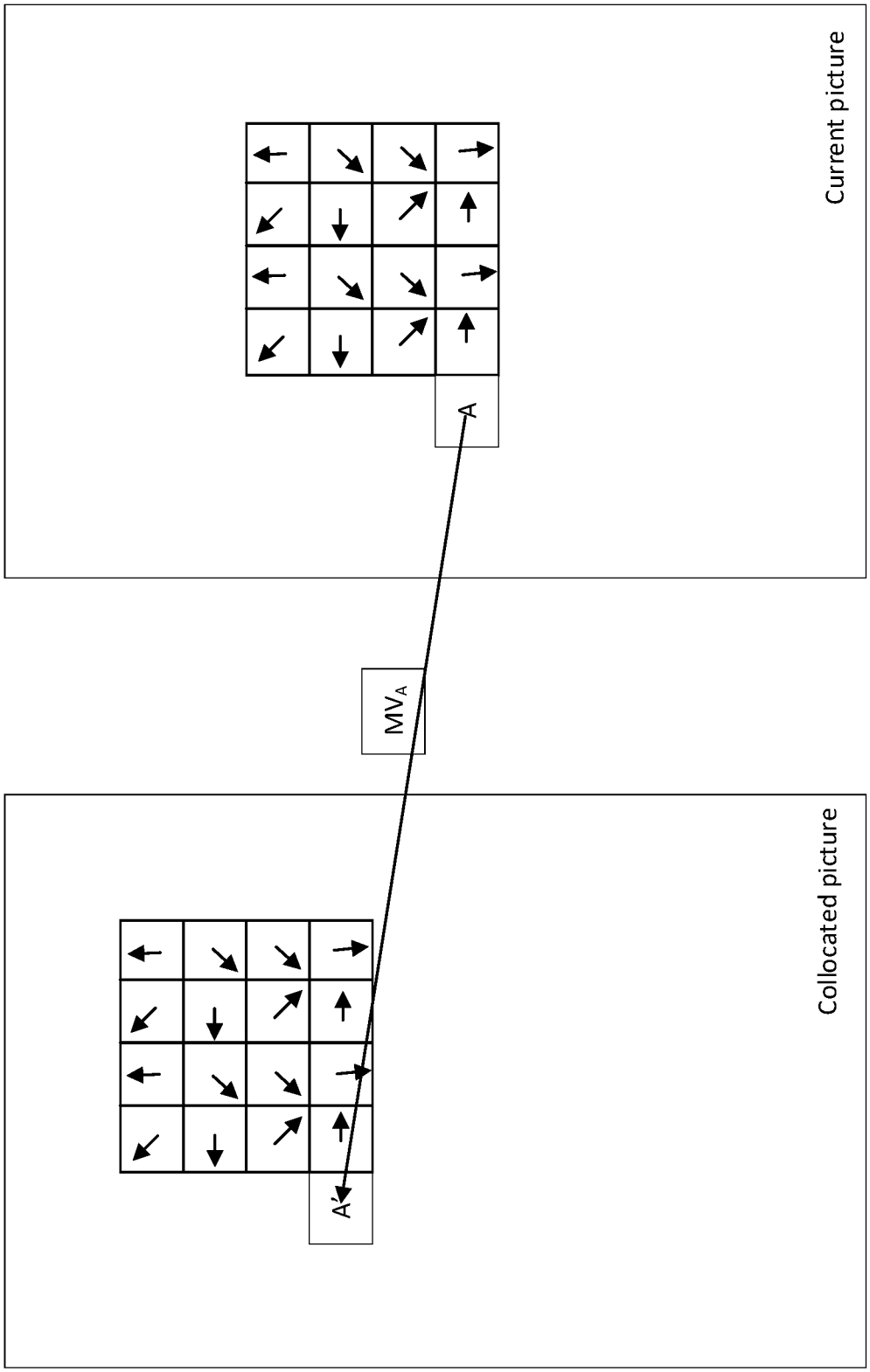
FIG. 3 shows an example of advanced temporal motion vector prediction.

FIG. 3 shows an example of ATMVP. A collocated block and/or a collocated picture associated with a current block may be identified based on the motion information of one or more spatial neighboring blocks of the current block. For example, a first available candidate block A from a merge candidate list of the current block may be considered. A motion vector (e.g., MVA) of block A and/or its reference index may be used to identify a collocated block A' and a collocated picture. The location of the collocated block A' inside the collocated picture may be determined, for example, by adding the motion vector MVA to the coordinates of the current block.

The motion information of a (e.g., each) sub-block inside a current block may be derived from the motion information of corresponding sub-block(s) (e.g., those indicated by short arrows in FIG. 3) of a collocated block. The motion information of the sub-block(s) in the collocated block may be converted to a motion vector and a reference index of the corresponding sub-block in the current block. For example, in manners similar to that of temporal motion vector prediction (TMVP), temporal motion vector scaling may be applied (e.g., to one or more motion vector(s) based on the temporal distance between two pictures or two blocks).

Figure 4:
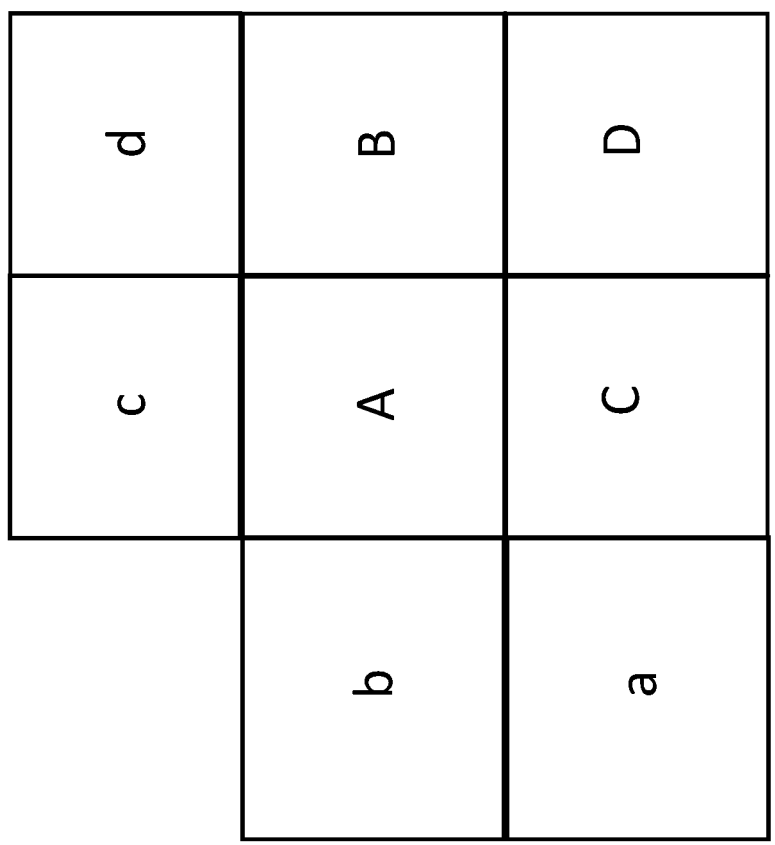
FIG. 4 shows an example of spatial-temporal motion vector prediction (STMVP).

With STMVP, the motion information of the sub-blocks inside a current block may be derived in a recursive manner. FIG. 4 shows an example of STMVP. It is assumed, without loss of generality, that a current block includes four sub-blocks (e.g., A, B, C and D. Neighboring blocks (e.g., spatial neighbors of the current block) may be labeled a, b, c and d. Motion derivation may be performed for sub-block A and may comprise identifying the spatial neighbors of sub-block A. For example, two spatial neighbors of sub-block A may be identified including the above-neighbor c and the left-neighbor b. If the above-neighbor c is not available or is intra-coded, motion information for other neighboring blocks above the current block may be checked in a certain order (e.g. from left to right). If the left-neighbor b is not available or is intra-coded, motion information and/or the availability of other neighboring blocks to the left of the current block may be checked in a certain order (e.g., from top to bottom). Motion information of the spatial neighbors (e.g., the motion information of the first available spatial neighbor) may be fetched. Motion information of a temporal neighbor of sub-block A may be obtained, for example, by following a procedure similar to a TMVP process. Motion information of the available spatial and temporal neighbors (e.g. up to three) may be averaged and used as the motion information of sub-block A. The actions described above may be repeated (e.g., based on a raster scan order) to derive the motion information of one or more other (e.g. all other) sub-blocks of the current video block.

FRUC may be supported for at least inter-coded blocks. When FRUC is enabled, the motion information (e.g., motion vectors and/or reference indices) of a current block may not be signaled. Rather, the motion information may be derived at the decoder side, for example, by template-matching, bilateral-matching, and/or the like. The merge candidate list of the current block and a set of preliminary motion vectors generated from the motion vectors of one or more temporal collocated blocks of the current block may be checked (e.g., during motion derivation at the decoder). A candidate motion vector that may lead to a minimum sum of absolute difference (SAD) may be selected as a starting point. A local search (e.g., based on template-matching or bilateral-matching) around the starting point may be performed, and a motion vector that results in a minimum SAD may be taken as the motion vector for the whole block. Motion information may be refined at a sub-block level, e.g., for better motion compensation efficiency.

Figure 5A:
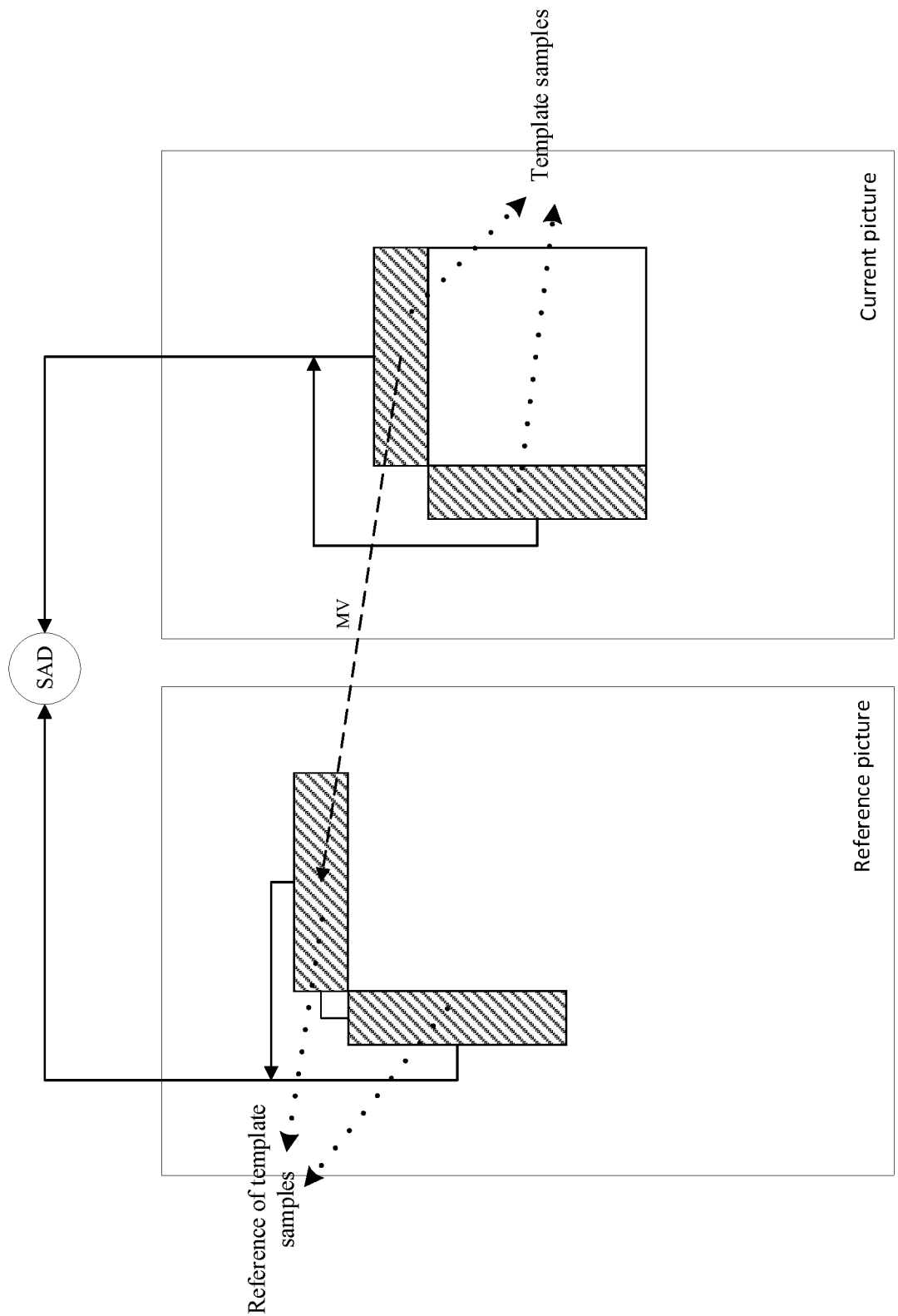
FIGS. 5A-B show examples of a frame-rate up conversion (FRUC).
Figure 5B:
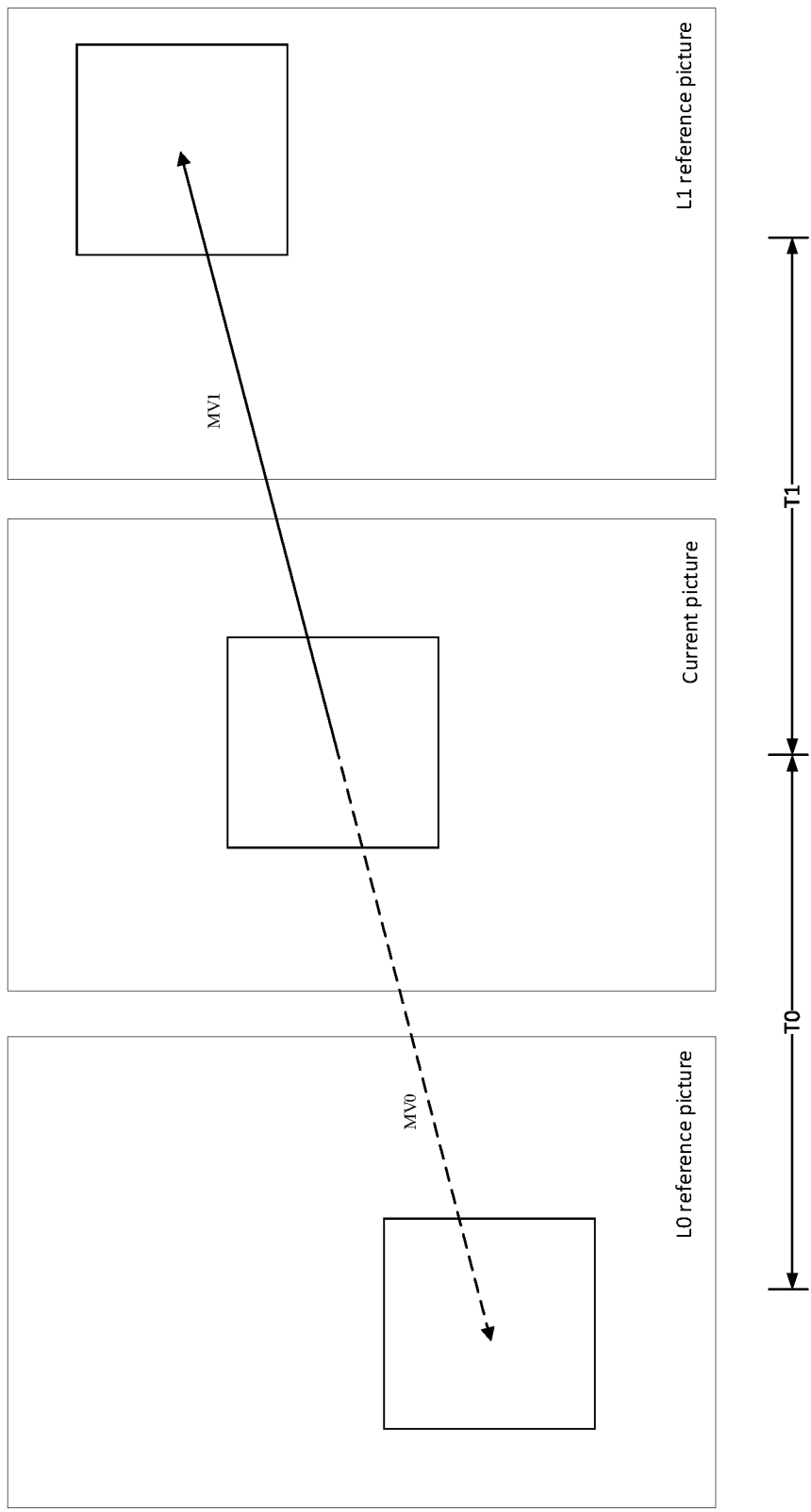

FIGS. 5A-B show examples of FRUC, among which the example in FIG. 5A shows an example of template-matching and the example in FIG. 5B shows an example of bilateral-matching. Template-matching may be used to derive the motion information of a current block by finding a match (e.g., the best match) between a template (e.g., top and/or left neighboring blocks of the current block) in the current picture and a block (e.g., which may have the same size as the template) in a reference picture. Bilateral-matching may be used to derive the motion information of a current block by finding a match (e.g., the best match) between two blocks along a motion trajectory of the current block in multiple (e.g., two) different reference pictures. A motion search operation during bilateral-matching may be based on motion trajectory. For example, as shown in FIG. 5B, motion vectors MV0 and MV1 that point to two reference blocks of the current block may be proportional to the temporal distances (e.g., T0 and T1) between the current picture and the two corresponding reference pictures L0 and L1.

A FRUC motion search (e.g., for template-matching and/or bilateral-matching) for a coding unit may comprise the following operations. A CU-level motion search may be performed, and an initial motion vector may be derived for the ej CU. The motion information of the CU may be refined at a sub-block level, for example, using the derived CU-level motion vector as a starting point. In examples, a current CU may be split into M×M sub-blocks. The value of M may be calculated, for example, in accordance with Eq. (1):

$$M = \max\left(4, \min\left(\frac{w}{2^D}, \frac{h}{2^D}\right)\right) \quad (1)$$

where w and h may be, respectively, a width and a height of the current CU. D may be a predefined splitting depth, which may, for example, be set to 3 and signaled in a sequence parameter set (SPS).

Figure 6B:
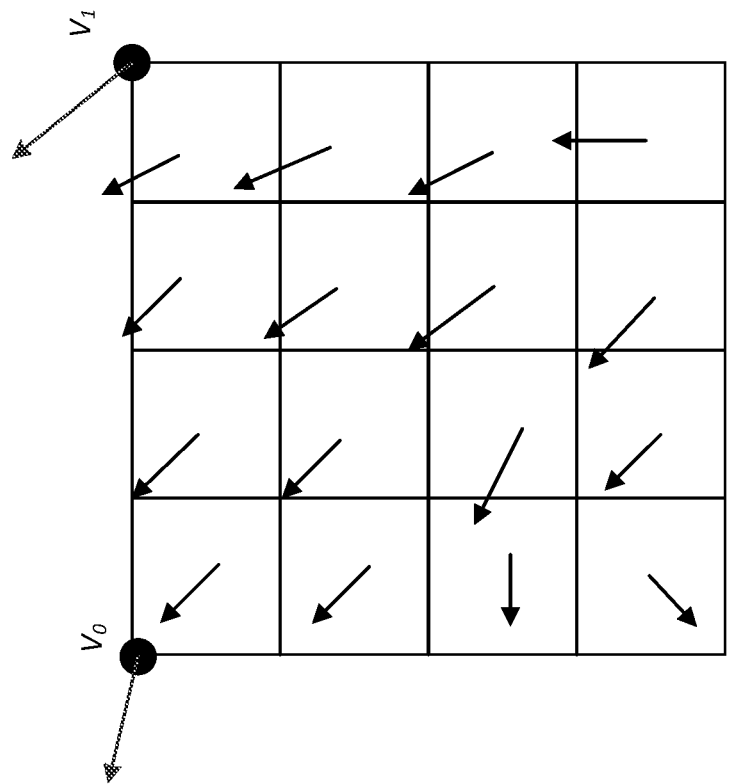
FIGS. 6A-B show examples of an affine model.
Figure 6A:
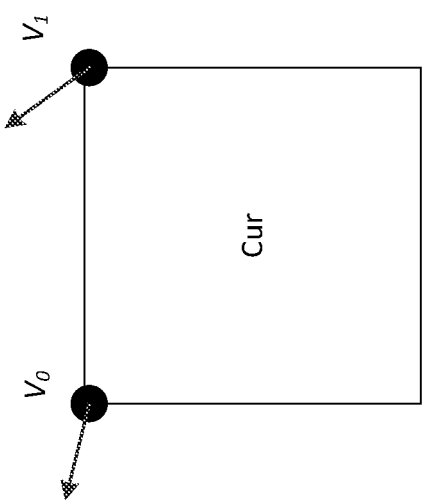

An affine model may be applied for motion compensation prediction, e.g., in additional to or in lieu of a translational motion model. The affine model may be used with many types of motions, e.g., zoom in/out, rotation, perspective motions, and/or other irregular motions. FIGS. 6A and 6B show examples of an affine model. A simplified affine model is shown in FIG. 6A, and a sub-block-level motion derivation for affine blocks is shown in FIG. 6B.

An affine motion field of a block may be described by one or more (e.g., two) control point motion vectors. A motion field of an affine block may be described based on a control point motion, for example, in accordance with Eq. (2):

$$v_x = \frac{(v_{1x} - v_{0x})}{w}x - \frac{(v_{1y} - v_{0y})}{w}y + v_{0x} \quad (2)$$
$$v_y = \frac{(v_{1y} - v_{0y})}{w}x + \frac{(v_{1x} - v_{0x})}{w}y + v_{0y}$$

where $(v_{0x}, v_{0y})$ may be a motion vector of a top-left corner control point and $(v_{1x}, v_{1y})$ may be a motion vector of a top-right corner control point (e.g., as shown in FIG. 6A). The motion field of a video block coded using an affine model may be derived based on a granularity that corresponds to an M×N sub-block (e.g., a sub-block with M×N pixels). The motion vector of an (e.g., each) M×N sub-block may be derived as follows. The motion vectors of respective center samples of one or more (e.g., each) sub-blocks (e.g., as shown in FIG. 6B) may be calculated, for example, according to Eq. (2). The calculation may be rounded, for example, to an accuracy of 1/16-pel. The derived motion vectors may be used at a motion compensation stage, for example, to generate prediction signals for the sub-blocks. The sub-block size (e.g., the values of M and N) that may be applied for affine motion compensation may be calculated, for example, in accordance with Eq. (3):

$$\begin{cases} M = clip3\left(4, w, \frac{w}{4 \cdot \max(\mathrm{abs}(v_{1x} - v_{0x}), \mathrm{abs}(v_{1y} - v_{0y}))}\right) \\ N = clip3\left(4, h, \frac{h}{4 \cdot \max(\mathrm{abs}(v_{2x} - v_{0x}), \mathrm{abs}(v_{2y} - v_{0y}))}\right) \end{cases} \quad (3)$$

where $(v_{2x}, v_{2y})$ may be a motion vector of a bottom-left control point (e.g., as calculated per Eq. (2). M and N may be, respectively, a width and a height of the derived sub-block size.

OBMC may remove or reduce blocking artifacts at a motion compensation stage. In OBMC, the motion information (e.g., motion vectors) of one or more neighboring blocks of a current block may be used to perform motion compensation for the current block. Multiple prediction signals derived using these neighboring motion vectors may be combined to generate a final prediction signal for the current block. If a CU is coded without sub-block partitions (e.g., the CU has a single MV in each prediction direction), OBMC may be performed for samples at the top and left boundaries (e.g., only for the top and left boundaries, and not for the right and bottom boundaries), e.g., using MVs associated with the left and top neighbors of the CU. If the CU is coded in a sub-block mode (e.g., ATMVP, STMVP, FRUC or affine mode), OBMC may be performed for samples at all boundaries (e.g., top, left, bottom, and right boundaries) of a sub-block.

Figure 8:
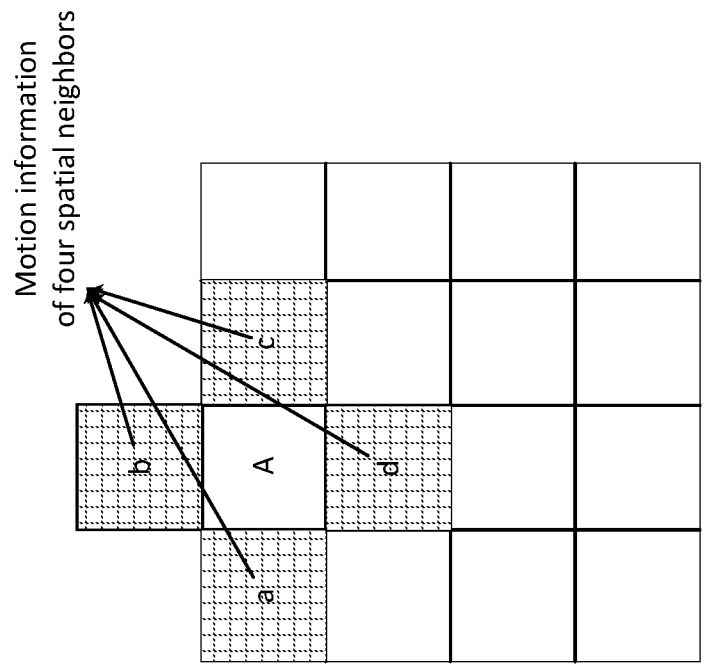
FIG. 8 shows an example of an OBMC process for CUs coded by a sub-block mode.
Figure 7:
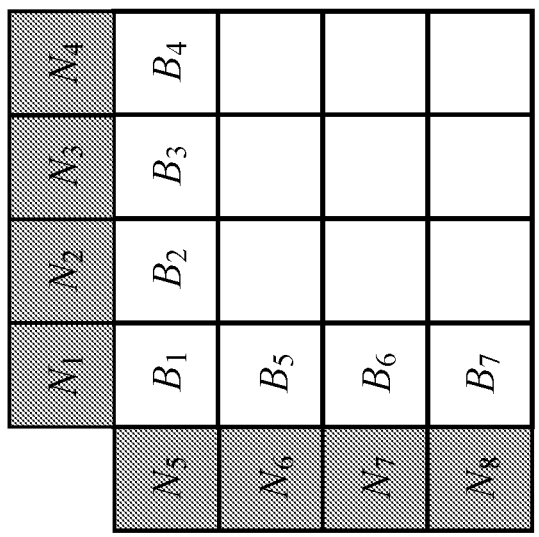
FIG. 7 shows an example of an OBMC process for coding units (CUs) coded without sub-block motion compensation.

FIG. 7 shows an example of applying OBMC to a CU not coded in a sub-block mode. B1 to B7 may be sub-blocks along the top and left boundaries of the CU. N1 to N8 may be neighboring sub-blocks of the CU above and to the left of the CU. FIG. 8 shows an example of applying OBMC to a CU coded in a sub-block mode. As shown, OBMC may be applied to a sub-CU block A using MVs of one or more (e.g., all four) of the neighboring blocks (e.g., a, b, c, d) of the sub-CU block A. Prediction signals may be derived based on the MVs of the neighboring sub-blocks (e.g., to the left, top, right and bottom of sub-block A). The prediction signals may be averaged (e.g., with respective weights) to generate a final prediction signal for sub-block A. OBMC may be applied to the luma and/or chroma components of sub-block A. In examples, OBMC for sub-block A may include a neighbor of the sub-block on a condition that the motion parameters (e.g., MVs and/or reference picture indices) associated with sub-block A and that neighbor are substantially different.

Weighted average may be applied in OBMC to generate a prediction signal for a sub-block. Denoting the prediction signal derived using a motion vector of a neighboring sub-block as PN and the prediction signal derived using a motion vector of the current sub-block as PC, samples in the first and/or last n (e.g., n=4) rows and/or columns of PN may be weight averaged with samples at the corresponding positions of PC. The samples to which weighted averaging may be applied may be determined based on the location of the neighboring sub-block. For example, samples in the first four rows of the current sub-block may be adjusted when the neighboring sub-block is a top neighbor (e.g., sub-block b in FIG. 8), samples in the last four rows of the current sub-block may be adjusted when the neighboring sub-block is a bottom neighbor (e.g., sub-block d in FIG. 8), samples in the first four columns of the current sub-block may be adjusted when the neighboring sub-block is a left neighbor (e.g., sub-block a in FIG. 8), and samples in the last four columns of the current sub-block may be adjusted when the neighboring sub-block is a right neighbor.

Different weighting factors may be applied in OBMC, for example, based on the prediction mode of a current CU. For example, when the current CU is not coded in a sub-block mode, weighting factors $\frac{1}{4}$, $\frac{1}{8}$, $\frac{1}{16}$, $\frac{1}{32}$ may be used for the first four rows and/or columns of PN and weighting factors $\frac{3}{4}$, $\frac{7}{8}$, $\frac{15}{16}$, $\frac{31}{32}$ may be used for the first four rows and/or columns of PC. When the current CU is coded in a sub-block mode, the first two (e.g., only the first two) rows and/or columns of PN and PC may be averaged, with weighting factors $\frac{1}{4}$, $\frac{1}{8}$ applied to PN and weighting factors $\frac{3}{4}$, $\frac{7}{8}$ applied to PC.

OBMC may be repeated multiple times (e.g., for each sub-block of a CU) in order to adjust the prediction signals for those sub-blocks. For instance, OBMC may be performed to generate prediction signals for the boundary sub-blocks of a CU along the top and left boundaries of the CU, and for one or more internal sub-blocks of the CU (e.g., sub-blocks located away from a boundary). For each of these sub-locks, the spatial neighbors of the sub-block may be checked in a certain order. For example, the neighbors may be checked in the order of above neighbors, left neighbors, below neighbors, and right neighbors (e.g., below and right neighbors may be considered only when the CU is coded using a sub-block mode). OBMC based on a neighboring sub-block may be skipped when that neighboring sub-block is associated with the same or substantially similar motion information as the current block. When OBMC is applied (e.g., when the motion information of a neighboring sub-block is substantially different from that of the current sub-block), the prediction signal derived using the motion information of the neighboring sub-block may be combined with the prediction signal derived using the motion information of the current sub-block.

The motion parameters of a neighboring sub-block located along a boundary of the current CU may have different characteristics than the motion parameters of a neighboring sub-block located inside the current CU. Further, multiple neighboring sub-blocks may have identical or highly correlated motion information. In examples, a neighboring block of the current CU may not be coded in a sub-block mode (e.g., the neighbor block may be coded with regular inter prediction mode and/or regular merge mode), and the sub-blocks (e.g., all of the sub-blocks) of this neighboring block may share the same or substantially similar motion parameters. These sub-blocks may be combined (e.g., treated as a group or a larger block for OBMC purposes) and OBMC-based motion compensation may be performed (e.g., only once) based on the larger block.

OBMC may be performed based on 4×4 units (e.g., a unit comprising 4×4 pixels) regardless of inter coding modes. The same OBMC process (e.g., including MV checking, motion compensation and prediction signal combination) may be repeated for all 4×4 units within a current CU. However, as described herein, different granularities (e.g., different sub-block sizes) may be used to derive motion parameters for different sub-block-based motion compensation operations. For example, for ATMVP and STMVP, motion derivation may be performed based on a fixed granularity (e.g., which may be signaled in an SPS). For FRUC, a CU may be split into multiple sub-blocks based on a predefined splitting depth (e.g., as shown in Eq. (1)), and the splitting depth may be signaled in an SPS. For affine mode, the sub-block size applicable to affine motion compensation may be calculated (e.g., per Eq. (3)) and may be dependent on the MVs of one or more controlling points (e.g., the top-left and top-right corners of a current CU). In light of these varying motion granularities, OBMC may be applied with the same or similar sub-block granularity used for motion derivation.

OBMC-based motion compensation may include external OBMC-based motion compensation and internal OBMC-based motion compensation. External OBMC-based motion compensation may refer to motion compensation for one or more boundary samples of a current CU using the MVs of one or more external sub-blocks (e.g., sub-blocks located outside the current CU). Internal OBMC-based motion compensation may refer to motion compensation for one or more samples of the current CU that are located along an inter-sub-block boundary inside the current CU. Such internal OBMC-based motion compensation may be performed based on neighboring sub-blocks that are also part of the current CU.

Internal OBMC-based motion compensation may be enabled for CUs coded with certain sub-block modes and disabled for CUs coded with other sub-block modes. For example, when motion parameters derived through a sub-block mode are consistent or deviate little from each other, the performance improvement achieved through internal OBMC may be limited. Accordingly, in at least some cases, a tradeoff between performance and complexity may be achieved by disabling internal OBMC for a current CU.

OBMC-based motion compensation that uses boundary sub-blocks outside a current CU (e.g., external OBMC-based motion compensation) may be performed separately from (e.g., not interleaved with) OBMC-based motion compensation that uses sub-blocks inside the CU (e.g., internal OBMC-based motion compensation). For example, external OBMC-based motion compensation may be performed in one step and internal OBMC-based motion compensation may be performed in another step.

For external OBMC-based motion compensation, a row or column-based sub-block merging scheme may be used to merge contiguous boundary sub-blocks sharing similar motion information into a sub-block group (SBG). OBMC-based motion compensation (e.g., a single OBMC operation or a single set of OBMC operations) may be performed based on the SBG.

For internal OBMC-based motion compensation, an MC operation may be performed based on variable sub-block sizes (e.g., instead of a fixed processing unit size such as a 4×4 unit). In examples, internal OBMC-based motion compensation may use the same (or substantially similar) sub-block size as that used for sub-block motion derivation.

Internal OBMC-based motion compensation may be selectively disabled for a CU. For example, internal OBMC-based motion compensation may be disabled for CUs coded in STMVP mode.

External OBMC-based motion compensation and internal OBMC-based motion compensation may be distinguished and/or performed separately. MVs of neighboring sub-blocks that lie outside the boundaries of a CU and MVs of sub-blocks that are inside the CU may possess characteristics, e.g., if the CU is coded using a sub-block mode (e.g., ATMVP, STMVP, FRUC, affine mode, etc.). For example, multiple sub-blocks outside a boundary of the CU may belong to the same coding block with identical or substantially similar motion. On the other hand, MVs of the sub-blocks inside the CU may be derived from temporal neighbors (e.g., in ATMVP and STMVP), from local template samples (e.g., in FRUC), or from fixed motion models (e.g., in affine mode). Therefore, MVs of external sub-blocks (e.g., from one or more neighboring CUs) may be more likely to be consistent with each other than MVs of internal sub-blocks (e.g., inside a CU).

Figure 9:
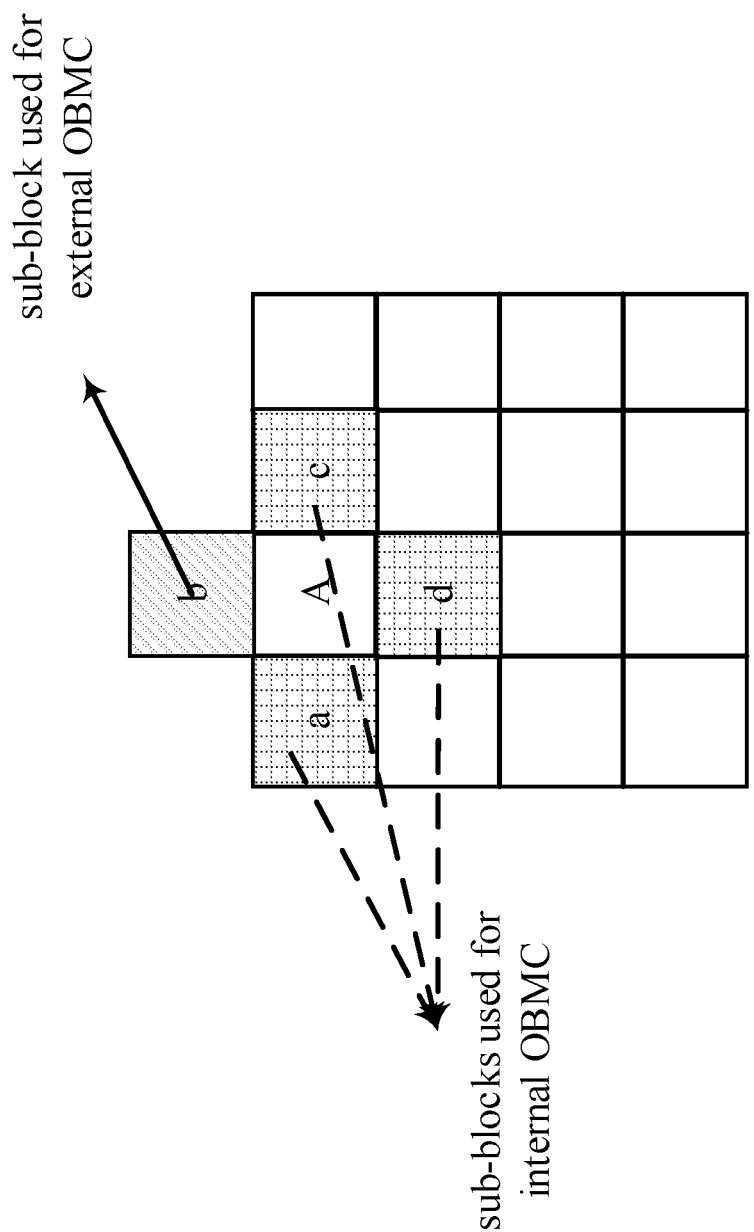
FIG. 9 shows an example comparing external OBMC-based motion compensation to internal OBMC-based motion compensation.

FIG. 9 shows a diagram illustrating the difference between external OBMC-based motion compensation and internal OBMC-based motion compensation. In the example, sub-block A may be a current sub-block of a current CU to which OBMC may be applied. A motion compensation operation may be considered an external OBMC-based motion compensation operation when the operation uses a neighboring sub-block (e.g., an above neighbor b) that belongs to neighboring CU above the current CU. A motion compensation operation may be considered an internal OBMC-based motion compensation operation when the operation uses a neighboring sub-block (e.g., sub-block a, c or d, which may be a left, right or below neighbor, respectively) that also belongs to the current CU. Internal OBMC-based motion compensation may (e.g. only) be enabled for inter CUs that are coded by sub-block modes while external OBMC-based motion compensation may be enabled for inter CUs (e.g. all inter CUs), e.g., regardless whether those CUs are coded with or without sub-block partitions.

As described herein, external and internal OBMC may be performed separately. For example, OBMC for samples located along the boundaries of a current CU (e.g., external OBMC) may be performed first, before OBMC for internal samples of the current CU (e.g., samples located further away from the boundaries) is performed (e.g., internal OBMC). The order may be reversed. For example, internal OBMC may be performed before external OBMC. External OBMC-based motion compensation may use MVs of spatial neighboring blocks (e.g., those above or to left) of a current CU to alleviate blocking artifacts on one or more boundaries of the current CU (e.g., the top and left boundaries of the CU). For instance, external OBMC-based motion compensation may be applied to adjust samples in the first two or four rows and/or the first two or four columns of samples along a boundary of the current CU, depending on whether or not the current CU is coded using a sub-block mode. For example, if the current CU is coded using a sub-block mode, the first two rows and/or columns of samples may be adjusted. If the current CU is not coded using a sub-block mode, the first four rows and/or columns of samples may be adjusted. When the current CU is coded in a sub-block mode, internal OBMC-based motion compensation (e.g., using neighboring sub-blocks that are also inside the current CU) may be enabled to further reduce blocking artifacts that may exist on one or more sub-block boundaries inside the current CU.

Figure 10:
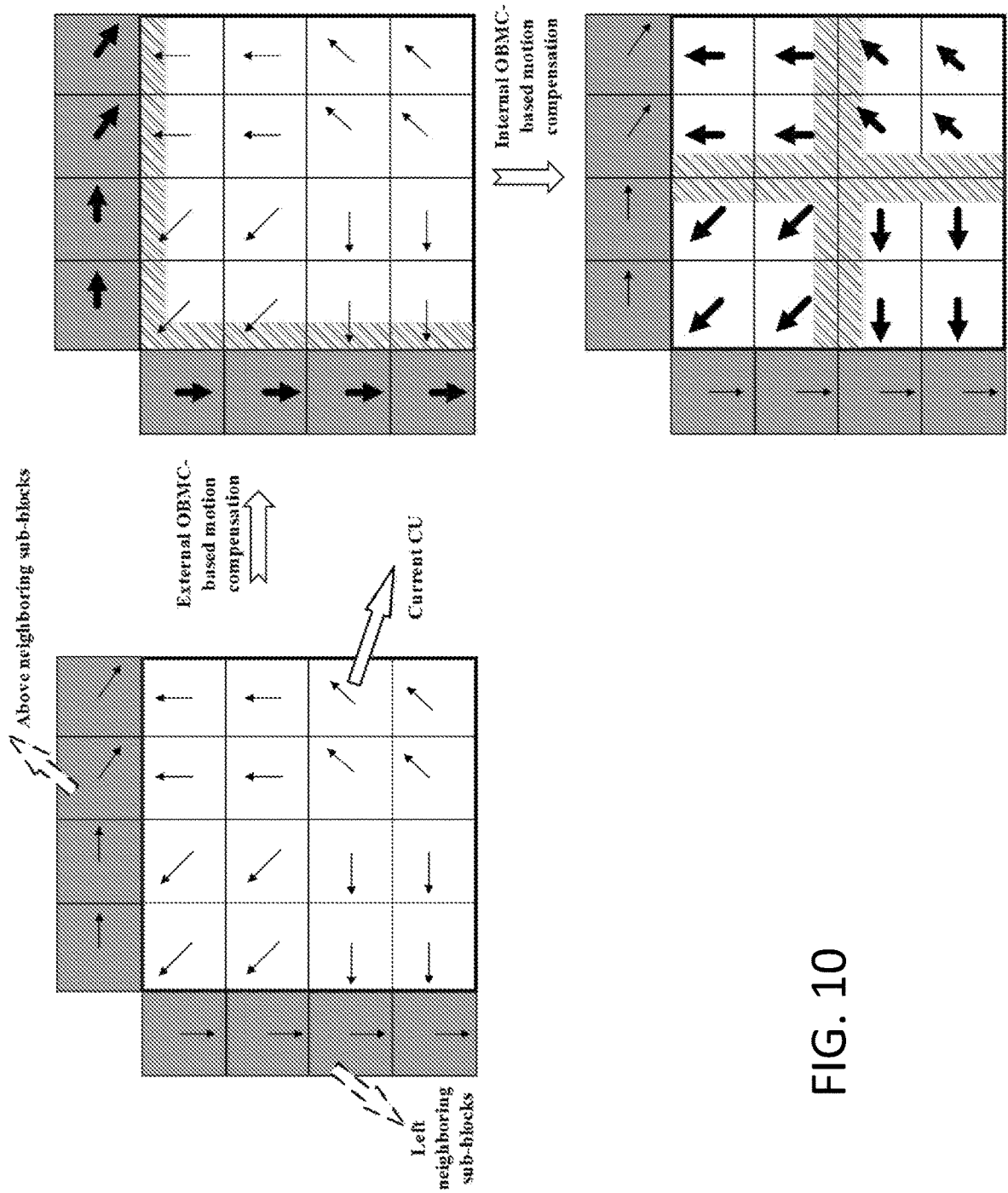
FIG. 10 shows an example of separately performing external and internal OBMC.

FIG. 10 illustrates examples of external and internal OBMC-based motion compensation. The current CU shown in the figure may or may not be coded by a sub-block mode. Bold arrows may represent MVs that may be used for OBMC-based motion compensation. Shaded areas may represent samples of the current CU that may be adjusted by OBMC-based motion compensation. In these examples, it is assumed that the MVs of the four corner sub-blocks of the current CU are identical, and therefore internal OBMC-based motion compensation may be applied to internal samples (e.g., only those internal samples) located in the middle of the current CU. As shown, external and internal OBMC-based motion compensation operations may be performed separately (e.g., boundary samples are motion-compensated first before internal samples are motion-compensated, or vice versa, as opposed to interleaving the OBMC operations of boundary and internal samples). This technique may be used together with other OBMC simplification measures described herein.

External OBMC-based motion compensation may be performed based on a merged row or column of neighboring blocks (e.g., 4×4 sub-blocks). For example, adjacent 4×4 neighboring blocks located along a boundary of a current CU and sharing the same or substantially similar motion information may be merged into a group. OBMC-based external motion compensation (e.g., a single OBMC operation) may be performed based on the group (e.g., using a common motion vector associated with the group of neighboring blocks, performing an OBMC operation based on the group as a whole, etc.).

FIGS. 11A and 11B show examples of external OBMC-based motion compensation for a current CU. FIG. 11A shows an example of external OBMC-based motion compensation without row- and/or column-based sub-block merging. FIG. 11B shows an example of external OBMC-based motion compensation using row- and/or column-based sub-block merging. In FIG. 11A, external OBMC prediction signals may be generated by performing motion compensation based on each 4×4 neighbor block of the current CU. This may result in a total of eight invocations of motion compensation. In FIG. 11B, external OBMC-based motion compensation may be performed using sub-block merging. As shown, multiple external blocks neighboring the current CU may be determined to have substantially similar (e.g., identical) motion information (e.g., motion compensation $MC_2$ may be performed based on the group). These blocks may be merged or grouped together (e.g., into group 1102, 1104, and/or 1106) and used in a merged OBMC operation for a plurality of boundary samples (e.g., samples located next to the merged neighboring blocks). For example, upon determining that the neighboring sub-blocks in group 1102 share substantially similar motion information, a plurality of boundary samples located next to that group may be identified and a merged OBMC operation may be performed on these samples together (e.g., in a single OBMC operation) based on the substantially similar motion information shared by group 1102. The plurality of boundary samples may comprise the left one or more columns of samples of multiple boundary sub-blocks of the current CU (e.g., sub-blocks 1120, 1122, 1124 and 1126 shown in FIG. 11B). Each of these boundary sub-blocks may be located opposite to one of the neighboring sub-blocks in group 1102 across the boundary of the current CU.

Also as shown in FIG. 11B, the neighboring sub-blocks in group 1104 may share substantially similar motion information (e.g., motion compensation $MC_0$ may be performed based on the group), and a plurality of boundary samples located next to that group may be identified and a merged OBMC operation may be performed on these samples together (e.g., through a single OBMC operation) based on the substantially similar motion information shared by group 1104. The plurality of boundary samples may comprise the top one or more rows of samples of multiple boundary sub-blocks of the current CU (e.g., sub-blocks 1120 and 1128 shown in FIG. 11B). Each of these boundary sub-blocks may be located opposite to one of the neighboring sub-blocks in group 1104 across the boundary of the current CU.

Also as shown in FIG. 11B, the neighboring sub-blocks in group 1106 may share substantially similar motion information (e.g., motion compensation $MC_1$ may be performed based on the group), and a plurality of boundary samples located next to that group may be identified and a merged OBMC operation may be performed on these samples together (e.g., through a single OBMC operation) based on the substantially similar motion information shared by group 1106. The plurality of boundary samples may comprise the top one or more rows of samples of multiple boundary sub-blocks of the current CU (e.g., sub-blocks 1130 and 1132 shown in FIG. 11B). Each of these boundary sub-blocks may be located opposite to one of the neighboring sub-blocks in group 1106 across the boundary of the current CU.

Using the sub-block merging techniques shown in FIG. 11B, the total number of motion compensation invocations for the boundary samples (e.g., along the left and top boundaries of the current CU) may be reduced from eight to three. As shown, sub-block merging may be performed in a horizontal direction and/or in a vertical direction. For example, motion compensation based on neighboring 4×4 blocks may be combined in a horizontal direction, e.g., as shown by $MC_0$ and $MC_1$, or in a vertical direction, e.g., as shown by $MC_2$.

The selection of the merge direction may depend on the boundary along which external OBMC-based motion compensation is applied. Row-based merging may be applied to combine neighboring blocks (e.g., 4×4 sub-blocks) with substantially similar (e.g., identical) motion in a horizontal direction. For example, row-based merging may be applied when external OBMC-based motion compensation is applied to neighboring blocks along the top boundary of a current CU. Column-based merging may be applied to combine neighboring blocks (e.g., 4×4 sub-blocks) with substantially similar (e.g., identical) motion in a vertical direction. For example, column-based merging may be applied when external OBMC-based motion compensation is applied to neighboring blocks along the left boundary of a current CU.

A condition for applying neighboring block merging may be based on the motion similarity of those neighboring blocks. For example, neighboring blocks may be merged if they have identical or substantially similar motion. Motion similarity may be determined, for example, by calculating motion vector difference and determining whether the calculated difference is equal to, less than and/or greater than a threshold (e.g., a pre-determined threshold). For example, two or more neighboring blocks (e.g., 4×4 neighboring blocks) sharing substantially similar motion may be merged. The motion (e.g., common or shared motion of the neighboring blocks) used in the merged OBMC operation may be taken from any of the blocks or may be calculated, for example, as an average motion of the neighboring blocks.

Internal OBMC-based motion compensation may be performed based on 4×4 processing units regardless of the inter coding mode(s) applied. Similar operations may be performed for every processing unit (e.g., 4×4 processing unit) of a current CU, including checking whether the current MV and the neighboring MV are identical and OBMC-based internal motion compensation. The granularity (e.g., sub-block size or processing unit size) used to calculate sub-block-level motion parameters (e.g., motion derivation) may be determined based on the sub-block coding mode (e.g., prediction mode) applied to the current CU.

Multiple 4×4 units (such as those belonging to a same sub-block used for motion derivation) may have the same or similar motion. When internal OBMC-based motion compensation is performed on each of these 4×4 processing units with similar motion, computational complexity and/or memory bandwidth may increase without providing additional coding benefits.

Figure 12B:
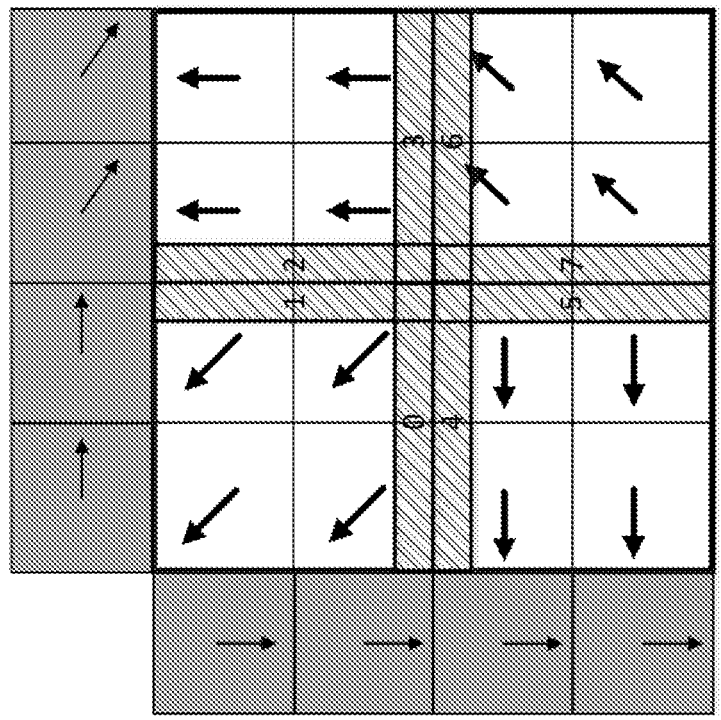
FIGS. 12A and 12B show an example of internal OBMC-based motion compensation.
Figure 12A:
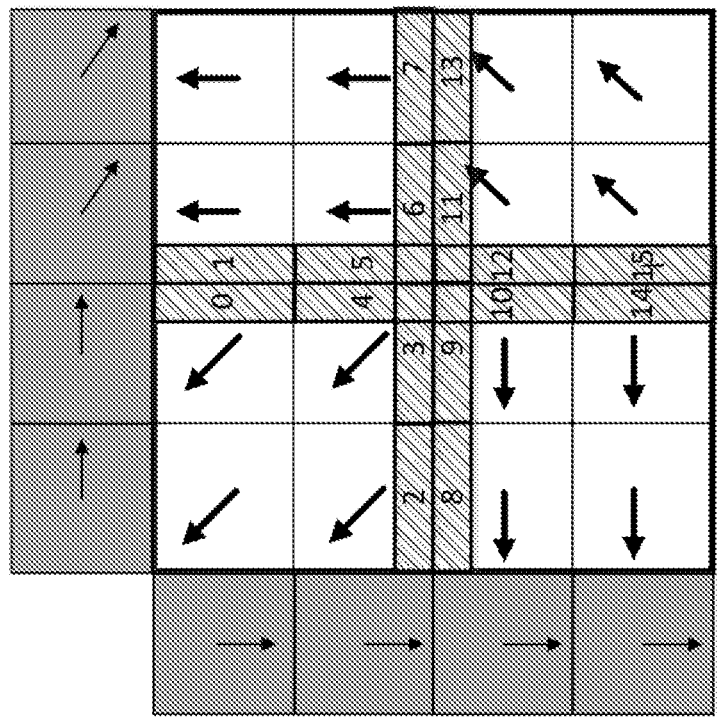

Internal OBMC-based motion compensation may use sub-block size alignment (e.g., using the same sub-block size or processing unit size for sub-block-level motion derivation and internal OBMC-based motion compensation). This may reduce the number of motion compensation operations and/or the need for repeated motion checking. FIGS. 12A and 12B show examples of internal OBMC-based motion compensation wherein sub-block level motion derivation is performed at the granularity of 8×8 sub-blocks (e.g., the sub-blocks or processing units used for motion derivation have a size of 8×8 pixels). FIG. 12A shows an example of internal OBMC-based motion compensation without sub-block size alignment. FIG. 12B shows an example of internal OBMC-based motion compensation with sub-block size alignment.

In FIG. 12A, internal OBMC-based motion compensation is performed for each 4×4 sub-block of a CU (e.g., without sub-block size alignment), resulting in a total of 16 motion compensation operations being performed in order to update the samples along the inter-sub-block boundaries of the CU.

In FIG. 12B, internal OBMC-based motion compensation with sub-block size alignment is performed. For example, if motion derivation for the current CU is performed based on 8×8 sub-blocks (e.g., each of the sub-blocks comprises more than one 4×4 unit), that same sub-block size may also be used for OBMC-based motion compensation (e.g., aligning the size of sub-blocks or processing units used for sub-block level motion derivation with the size of sub-blocks or processing units used for internal OBMC-based motion compensation). Using this technique, the number of motion compensation operations performed for the same number of samples shown in FIG. 12A may be reduced (e.g., by avoiding unnecessary motion checking between 4×4 units that are within the same processing unit or sub-block). As shown in FIG. 12B, a total of eight motion compensation operations may be performed by using the sub-block size alignment technique described herein.

Internal OBMC-based motion compensation may be skipped (e.g., disabled). For example, internal OBMC-based motion compensation may be skipped (e.g., disabled) for certain sub-block coding modes such as for STMVP. A motion field derived by STMVP may have different characteristics compared to that derived by one or more other sub-block coding modes. For example, the motion parameters of a sub-block coded with STMVP may be recursively derived by averaging the motion information of one or more spatial and/or temporal neighbors of the sub-block inside the CU (e.g., based on a raster scan order). The motion parameters in other sub-block modes may be derived based on temporal neighbors (e.g., as in ATMVP), based on spatial and/or temporal template samples (e.g., as in FRUC), and/or based on a fixed motion model controlled by one or more key points (e.g., as in affine mode). STMVP may produce more steady motion or relatively consistent motion parameters for the sub-blocks inside an STMVP-code CU, and as such additional performance enhancement provided by internal OBMC-based motion compensation may be limited for such an STMVP-coded CU.

Figure 13:
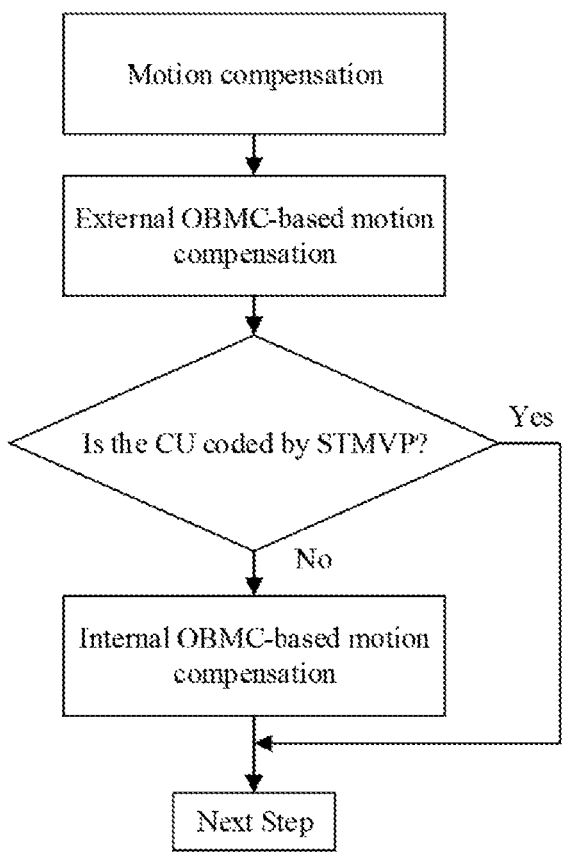
FIG. 13 shows an example of disabling internal OBMC-based motion compensation for CUs coded in an STMVP mode.

FIG. 13 shows example OBMC operations that may skip (e.g., disable) internal OBMC-based motion compensation for an STMVP-code CU.

Figure 14A:
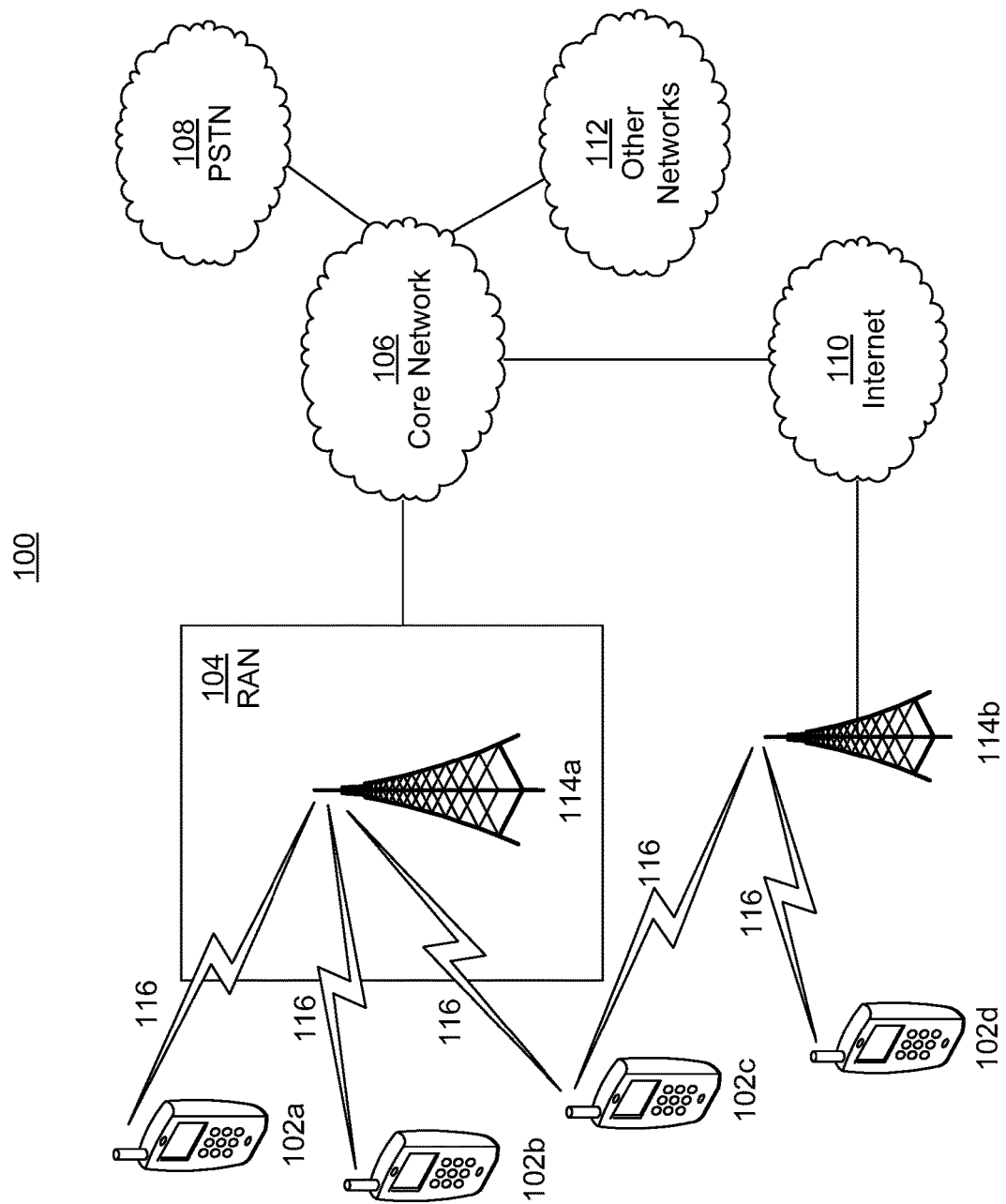
FIG. 14A is a system diagram illustrating an example communications system in which one or more disclosed embodiments may be implemented.

FIG. 14A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 14A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g. remote surgery), an industrial device and applications (e.g. a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g. radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g. an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 14A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g. for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g. WCDMA, CDMA2000, GSM, LTE, LTE-A, LTE-A Pro, NR etc.) to establish a picocell or femtocell. As shown in FIG. 14A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 14A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g. the WTRUs 102a, 102b, 102c, 102d may include multiple transceivers for communicating with different wireless networks over different wireless links). For example, the WTRU 102c shown in FIG. 14A may be configured to communicate with the base station 114a, which may employ a cellular-based radio technology, and with the base station 114b, which may employ an IEEE 802 radio technology.

Figure 14B:
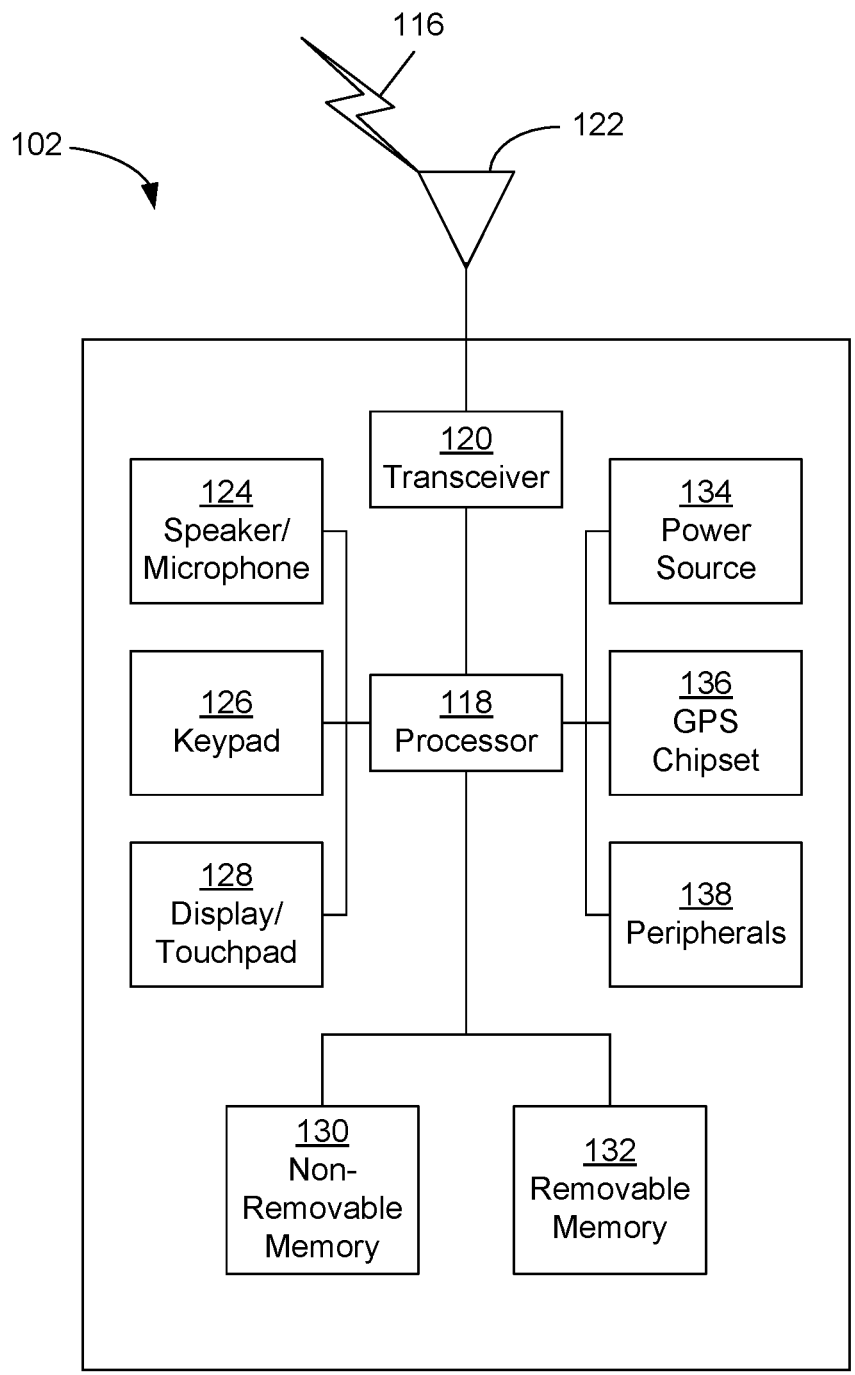
FIG. 14B is a system diagram illustrating an example wireless transmit/receive unit (WTRU) that may be used within the communications system illustrated in FIG. 14A according to an embodiment.

FIG. 14B is a system diagram illustrating an example WTRU 102. As shown in FIG. 14B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 14B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g. the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 14B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g. multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g. a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g. nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g. longitude and latitude) regarding the current location of the WTRU 102. In addition to, or in lieu of, the information from the GPS chipset 136, the WTRU 102 may receive location information over the air interface 116 from a base station (e.g. base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor The WTRU 102 may include a full duplex radio for which transmission and reception of some or all of the signals (e.g. associated with particular subframes for both the UL (e.g. for transmission) and downlink (e.g. for reception) may be concurrent and/or simultaneous. The full duplex radio may include an interference management unit to reduce and or substantially eliminate self-interference via either hardware (e.g. a choke) or signal processing via a processor (e.g. a separate processor (not shown) or via processor 118). In an embodiment, the WRTU 102 may include a half-duplex radio for which transmission and reception of some or all of the signals (e.g. associated with particular subframes for either the UL (e.g. for transmission) or the downlink (e.g. for reception))

Figure 14C:
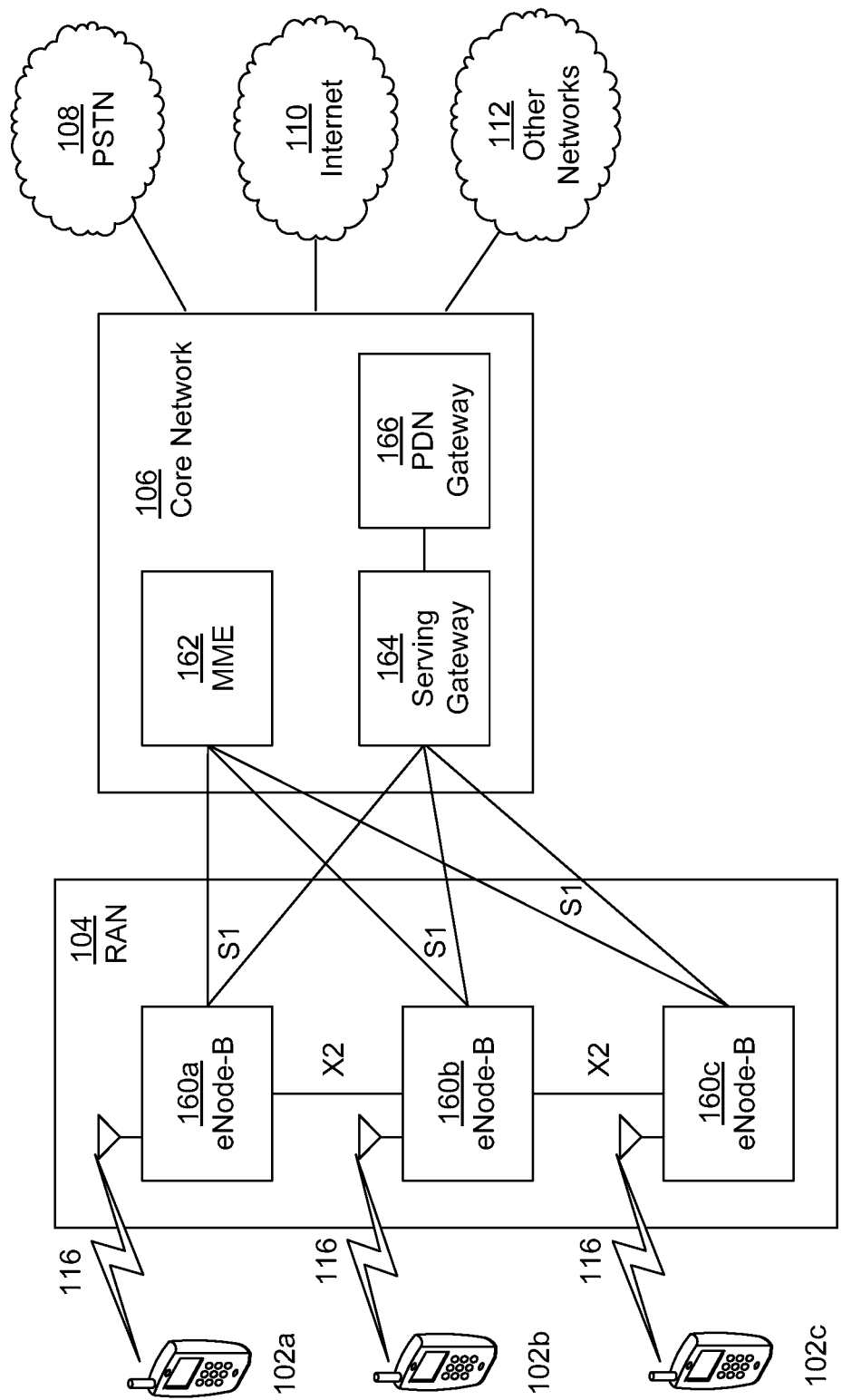
FIG. 14C is a system diagram illustrating an example radio access network (RAN) and an example core network (CN) that may be used within the communications system illustrated in FIG. 14A according to an embodiment.

FIG. 14C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 14C, the eNode-Bs 160a, 160b, 160c may communicate with one another over an X2 interface.

The CN 106 shown in FIG. 14C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g. an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers Although the WTRU is described in FIGS. 16A-17D as a wireless terminal, it is contemplated that in certain representative embodiments that such a terminal may use (e.g. temporarily or permanently) wired communication interfaces with the communication network.

In representative embodiments, the other network 112 may be a WLAN

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g. directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g. all of the STAs) within or using the IBSS may communicate directly with each other. The IBSS mode of communication may sometimes be referred to herein as an "ad-hoc" mode of communication When using the 802.11ac infrastructure mode of operation or a similar mode of operations, the AP may transmit a beacon on a fixed channel, such as a primary channel. The primary channel may be a fixed width (e.g. 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g. every STA), including the AP, may sense the primary channel. If the primary channel is sensed/detected and/or determined to be busy by a particular STA, the particular STA may back off. One STA (e.g. only one station) may transmit at any given time in a given BSS High Throughput (HT) STAs may use a 40 MHz wide channel for communication, for example, via a combination of the primary 20 MHz channel with an adjacent or nonadjacent 20 MHz channel to form a 40 MHz wide channel Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC)

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g. only support for) certain and/or limited bandwidths. The MTC devices may include a battery with a battery life above a threshold (e.g. to maintain a very long battery life)

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g. MTC type devices) that support (e.g. only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

Figure 14D:
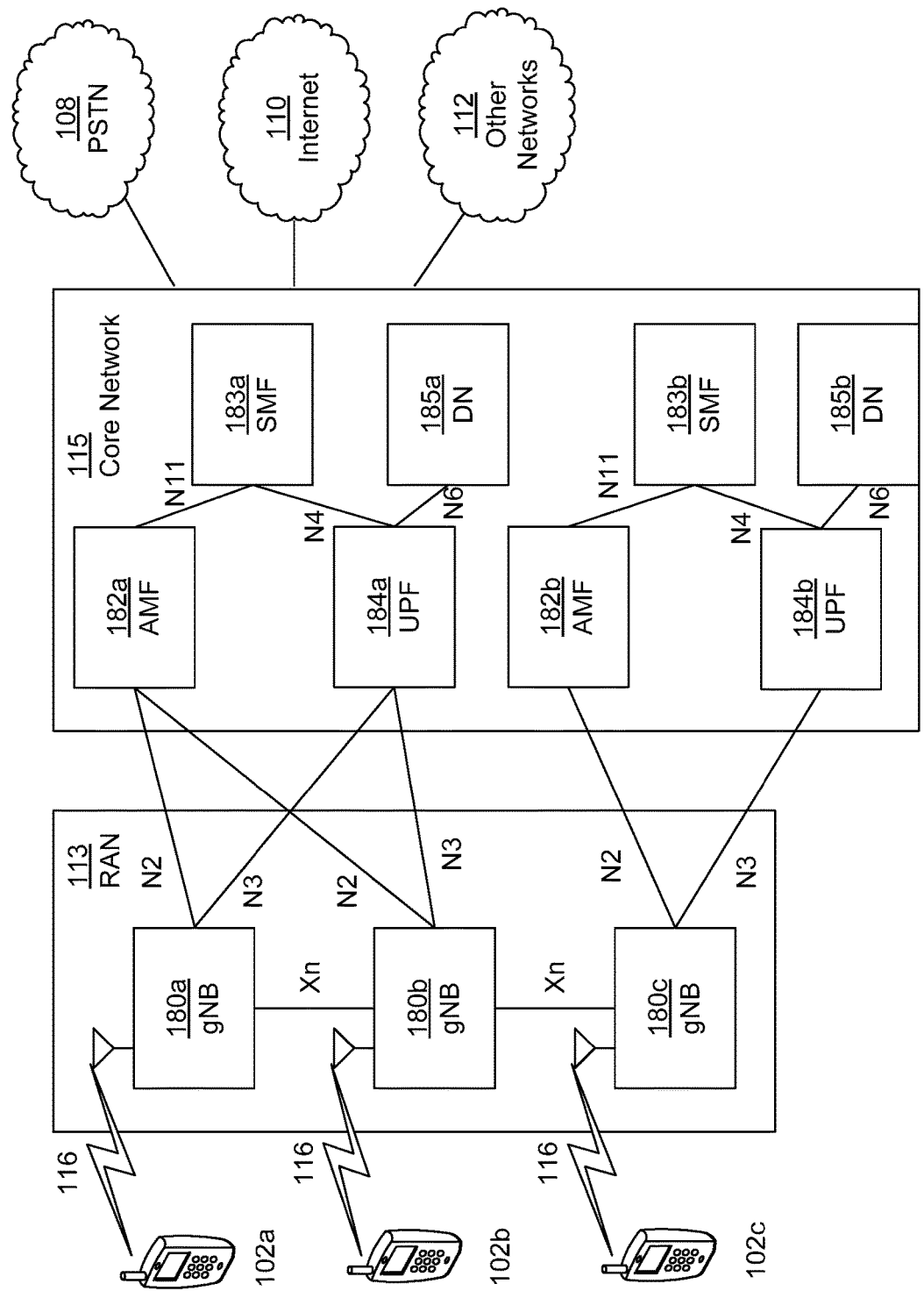
FIG. 14D is a system diagram illustrating a further example RAN and a further example CN that may be used within the communications system illustrated in FIG. 14A according to an embodiment.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 14D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g. containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g. such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 14D, the gNBs 180a, 180b, 180c may communicate with one another over an Xn interface.

The CN 115 shown in FIG. 14D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g. handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g. an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 16A-16D, and the corresponding description of FIGS. 16A-16D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*b*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

Systems, methods, and instrumentalities have been disclosed for OBMC. External OBMC-based motion compensation may be distinguished and separated from internal OBMC-based motion compensation. External OBMC-based motion compensation may be implemented on sub-blocks and sub-block groups, for example, by merging contiguous boundary sub-blocks with the same or similar motion into a sub-block-group and performing OBMC-based motion compensation for the sub-block-group. Internal OBMC-based motion compensation may be implemented on variable sub-block sizes. In an example, internal OBMC-based motion compensation may use the same sub-block size that may be used for sub-block-level motion derivation. Internal OBMC-based motion compensation may be disabled, for example, for CUs that may be coded by spatial-temporal motion vector prediction (STMVP) mode.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method of processing video data, the method comprising:
    obtaining a current coding unit (CU), the current CU neighboring a plurality of external sub-blocks along a boundary of the current CU;
    determining that the plurality of external sub-blocks shares substantially similar motion information;
    identifying a plurality of boundary samples inside the current CU, wherein the boundary samples belong to one or more sub-blocks of the current CU that are located across the boundary from the plurality of external sub-blocks;
    determining a motion vector that represents the substantially similar motion information shared by the plurality of external sub-blocks; and
    performing motion compensation for the boundary samples based on the plurality of external sub-blocks, wherein, during the motion compensation, the plurality of external sub-blocks is treated as an enlarged block using the motion vector that represents the substantially similar motion information shared by the plurality of external sub-blocks.

2. The method of claim 1, wherein the motion compensation for the boundary samples is invoked only once based on the plurality of external sub-blocks as a whole.

3. The method of claim 1, wherein performing the motion compensation for the boundary samples comprises determining a reference block associated with the enlarged block using the motion vector that represents the substantially similar motion information shared by the plurality of external sub-blocks, and performing an overlapped block motion compensation (OBMC) operation for the boundary samples based on the reference block.

4. The method of claim 1, wherein the boundary samples are located along a horizontal boundary of the current CU.

5. The method of claim 1, wherein the one or more sub-blocks of the current CU have a sub-block size of 4×4 pixels.

6. The method of claim 1, wherein determining that the external sub-blocks share substantially similar motion information comprises comparing the respective motion vectors associated with the external sub-blocks and determining that the difference between the respective motion vectors is smaller than a threshold.

7. The method of claim 1, wherein the current CU is coded using a sub-block coding mode.

8. The method of claim 1, wherein the current CU is coded in a sub-block coding mode and comprises a plurality of internal samples located along one or more inter-sub-block boundaries inside the current CU, wherein the method further comprises determining whether to apply motion compensation to the internal samples based on whether the current CU is coded in a spatial temporal motion vector prediction (STMVP) mode, wherein motion compensation is applied to the internal samples if the current CU is not coded in the STMVP mode, and wherein motion compensation is not applied to the internal samples if the current CU is coded in the STMVP mode.

9. The method of claim 8, further comprising:
deriving motion information for the current CU based on a motion derivation sub-block size that is larger than 4×4 pixels;
selecting the internal samples from a sub-block of the current CU, wherein the sub-block has a same sub-block size as the motion derivation sub-block size and the internal samples belong to different 4×4 units of the sub-block; and
performing motion compensation for the internal samples based on the motion derivation sub-block size.

10. A video decoding device, comprising:
a processor configured to:
obtain a current coding unit (CU) in a video bitstream, the current CU neighboring a plurality of external sub-blocks along a boundary of the current CU;
determine that the plurality of external sub-blocks shares substantially similar motion information;
identify a plurality of boundary samples inside the current CU, wherein the boundary samples belong to one or more sub-blocks of the current CU that are located across the boundary from the plurality of external sub-blocks;
determine a motion vector that represents the substantially similar motion information shared by the plurality of external sub-blocks; and
perform motion compensation for the boundary samples based on the plurality of external sub-blocks, wherein, during the motion compensation, the plurality of external sub-blocks is treated as an enlarged block using the motion vector that represents the substantially similar motion information shared by the plurality of external sub-blocks.

11. The video decoding device of claim 10, wherein the motion compensation for the boundary samples is invoked only once based on the plurality of external sub-blocks as a whole.

12. The video decoding device of claim 10, wherein the processor being configured to perform the motion compensation for the boundary samples comprises the processor being configured to determine a reference block associated with the enlarged block using the motion vector that represents the substantially similar motion information shared by the plurality of external sub-blocks, and perform an overlapped block motion compensation (OBMC) operation for the boundary samples based on the reference block.

13. The video decoding device of claim 10, wherein the boundary samples are located along a horizontal boundary of the current CU.

14. The video decoding device of claim 10, wherein the one or more sub-blocks of the current CU have a sub-block size of 4×4 pixels.

15. The video decoding device of claim 10, wherein the external sub-blocks have a sub-block size of 4×4 pixels.

16. The video decoding device of claim 10, wherein the processor being configured to determine that the external sub-blocks share substantially similar motion information comprises the processor being configured to compare the respective motion vectors associated with the external sub-blocks and determine that the difference between the respective motion vectors is smaller than a threshold.

17. The video decoding device of claim 10, wherein the current CU is coded using a sub-block coding mode.

18. The video decoding device of claim 10, wherein the current CU is coded in a sub-block coding mode and comprises a plurality of internal samples located along one or more inter-sub-block boundaries inside the current CU, wherein the processor is further configured to determine whether to apply motion compensation for the internal samples based on whether the current CU is coded in a spatial-temporal motion vector prediction (STMVP) mode, wherein motion compensation is applied to the internal samples if the current CU is not coded in the STMVP mode, and wherein motion compensation is not applied to the internal samples if the current CU is coded in the STMVP mode.

19. The video decoding device of claim 18, wherein the processor is further configured to:
derive motion information for the current CU based on a motion derivation sub-block size that is larger than 4×4 pixels;
select the internal samples from a sub-block of the current CU, wherein the sub-block has a same sub-block size as the motion derivation sub-block size and the internal samples belong to different 4×4 units of the sub-block; and
perform motion compensation for the internal samples based on the motion derivation sub-block size.

20. A video encoding device, comprising:
a processor configured to:
obtain a current coding unit (CU), wherein the current CU neighbors a plurality of external sub-blocks along a boundary of the current CU;
determine that the plurality of external sub-blocks shares substantially similar motion information;
identify a plurality of boundary samples inside the current CU, wherein the boundary samples belong to one or more sub-blocks of the current CU that are located across the boundary from the plurality of external sub-blocks;
determine a motion vector that represents the substantially similar motion information shared by the plurality of external sub-blocks; and
perform motion compensation for the boundary samples based on the plurality of external sub-blocks, wherein, during the motion compensation, the plurality of external sub-blocks is treated as an enlarged block using the motion vector that represents the substantially similar motion information shared by the plurality of external sub-blocks.

21. The video encoding device of claim 20, wherein the current CU is coded using a sub-block coding mode, and wherein the motion compensation for the boundary samples is invoked only once based on the plurality of external sub-blocks as a whole.

* * * * *